United States Patent
Lack et al.

(10) Patent No.: US 12,325,827 B1
(45) Date of Patent: Jun. 10, 2025

(54) BIOMASS SLURRY PREPARATION FOR SUBTERRANEAN INJECTION

(71) Applicant: Anew Climate, LLC, Houston, TX (US)

(72) Inventors: Randall Norman Lack, Bellaire, TX (US); Mark Junichi Havel, Houston, TX (US); Mihaly Istvan Wekler, Houston, TX (US); Alexis Rafael Berthi Leon, Houston, TX (US)

( * ) Notice: Subject to any disclaimer, the term of this patent is extended or adjusted under 35 U.S.C. 154(b) by 0 days.

(21) Appl. No.: 18/907,261

(22) Filed: Oct. 4, 2024

(51) Int. Cl.
| | |
|---|---|
| C09K 8/90 | (2006.01) |
| B01F 23/50 | (2022.01) |
| B01F 23/70 | (2022.01) |
| B01F 35/213 | (2022.01) |
| B01F 35/22 | (2022.01) |

(Continued)

(52) U.S. Cl.
CPC .............. *C09K 8/90* (2013.01); *B01F 23/511* (2022.01); *B01F 23/581* (2022.01); *B01F 23/59* (2022.01); *B01F 23/71* (2022.01); *B01F 35/213* (2022.01); *B01F 35/2203* (2022.01); *E21B 21/062* (2013.01); *B01F 2101/49* (2022.01); *B01F 2215/0431* (2013.01); *B01F 2215/044* (2013.01); *C09K 2208/08* (2013.01)

(58) Field of Classification Search
None
See application file for complete search history.

(56) References Cited

U.S. PATENT DOCUMENTS

| | | | | | |
|---|---|---|---|---|---|
| 3,583,485 | A | * | 6/1971 | Woods | E21B 33/14 166/288 |
| 4,108,779 | A | * | 8/1978 | Carney | C09K 8/36 507/131 |

(Continued)

FOREIGN PATENT DOCUMENTS

EP 2142451 B1 6/2012

OTHER PUBLICATIONS

Brian F. Snyder, Biomass slurry fracture injection as a potential low-cost negative emissions technology, Environ. Res. Lett. 17 (2022) 024013, https://doi.org/10.1088/1748-9326/ac4c5c, published on Jan. 28, 2022, 13 pages.

(Continued)

*Primary Examiner* — John J Figueroa
(74) *Attorney, Agent, or Firm* — Smith & Woldesenbet Law Group, PLLC

(57) ABSTRACT

A method for preparing a biomass slurry for subterranean injection can include obtaining a quantity of a biomass slurry feedstock from a source, wherein the biomass slurry feedstock comprises a plurality of pieces, where the biomass slurry feedstock comprises a composite of cellulose in a lignin matrix, hemicellulose fibers in a lignin matrix, or any combination thereof, and where each of the plurality of pieces has a size not to exceed approximately 60,000 μm. The method can also include obtaining a volume of a fluid, where the fluid comprises a salt content of at least approximately 0.05%. The method can further include mixing the plurality of pieces and the volume of fluid to form the biomass slurry, where the plurality of pieces are substantially evenly distributed within the fluid, and where the biomass slurry is configured to be used in the subterranean injection.

9 Claims, 6 Drawing Sheets

(51) Int. Cl.
  *E21B 21/06* (2006.01)
  *B01F 101/49* (2022.01)

(56) References Cited

U.S. PATENT DOCUMENTS

| | | | | |
|---|---|---|---|---|
| 5,631,053 | A * | 5/1997 | Andersen | B28B 3/02 |
| | | | | 428/35.8 |
| 2005/0067122 | A1 * | 3/2005 | Kazem | D21C 9/153 |
| | | | | 162/29 |
| 2005/0150618 | A1 * | 7/2005 | Kazem | B01F 27/2722 |
| | | | | 162/65 |
| 2010/0233769 | A1 * | 9/2010 | Heathcote | B01F 25/31241 |
| | | | | 435/157 |
| 2012/0100045 | A1 * | 4/2012 | Beldring | B01F 33/8305 |
| | | | | 366/156.1 |
| 2015/0368541 | A1 * | 12/2015 | Monclin | C09K 8/68 |
| | | | | 507/108 |
| 2017/0145285 | A1 * | 5/2017 | Lafitte | C09K 8/035 |
| 2021/0324258 | A1 * | 10/2021 | Allen, III | C09K 8/514 |
| 2024/0018850 | A1 | 1/2024 | Abou-Sayed et al. | |

OTHER PUBLICATIONS

Mezlul Arfie et al., Implementation of Slurry Fracture Injection Technology for E&P Wastes at Duri Oilfield, Society of Petroleum Engineers, SPE 96543-PP, presented at the SPE Asia Pacific Health, Safety, and Environment Conference and Exhibition, Kuala Lumpur, Malaysia, Sep. 19-20, 2005, 14 pages.

Nediljka Guarina-Medimurec et al., Deep Underground Injection of Waste from Drilling Activities—An Overview, Minerals 2020, 10, 303, published on Mar. 27, 2020, MDPI, Basel, Switzerland, 29 pages.

John A. Veil et al., Evaluation of Slurry Injection Technology For Management of Drilling Wastes, Argonne National Laboratory, prepared for U.S. Department of Energy National Petroleum Technology Office under contract W-31-109-ENG-38, May 2003, 110 pages.

* cited by examiner

BIOMASS SLURRY PREPARATION FOR SUBTERRANEAN INJECTION

TECHNICAL FIELD

The present application is related to subterranean field operations and, more particularly, to biomass slurry preparation for subterranean injection.

BACKGROUND

As wood waste biomass degrades and decomposes, carbon-based products (e.g., carbon dioxide) form and are released into the surrounding environment. Many of these carbon-based products are in gaseous form, and so are released into the atmosphere, contributing to the greenhouse effect as part of the terrestrial biological carbon cycle. While some of the wood waste biomass degrades and decomposes on an uncontrolled basis in an uncontrolled environment, other wood waste biomass may be collected and/or accumulated as part of a process (e.g., thinning of forested land, remnants from a manufacturing process (e.g., paper making, furniture making, lumber processing)) and/or a byproduct thereof. The collection and sequestration of wood waste in durable storage can prevent the atmospheric release of carbon dioxide and other gaseous carbon-based products, thereby removing the biogenic carbon from the terrestrial biological carbon cycle and reducing the rate of climate change.

SUMMARY

In general, in one aspect, the disclosure relates to a method for preparing a biomass slurry for subterranean injection. The method can include obtaining a quantity of a biomass slurry feedstock from a source, where the biomass slurry feedstock comprises a plurality of pieces, where the biomass slurry feedstock includes a composite of cellulose in a lignin matrix, and hemicellulose fibers in a lignin matrix, or any combination thereof, and where each of the plurality of pieces has a size not to exceed approximately 60,000 μm. The method can also include obtaining a volume of a fluid, where the fluid has a salt content of at least approximately 0.05%. The method can further include mixing the biomass slurry feedstock and the volume of fluid to form the biomass slurry, where the plurality of pieces are substantially evenly distributed within the fluid, and where the biomass slurry is configured to be used in the subterranean injection.

In another aspect, the disclosure relates to a system for preparing a biomass slurry for subterranean injection. The system can include a mixing apparatus, where the mixing apparatus can include a vessel. The mixing apparatus can also include a first input to the vessel, where the first input is configured to receive a plurality of pieces of a biomass slurry feedstock, where each of the plurality of pieces has a size not to exceed approximately 60,000 μm. The mixing apparatus can further include a second input to the vessel, where the second input is configured to receive a fluid to the vessel, where the fluid has a salt content of at least approximately 0.05%. The mixing apparatus can also include a mixer configured to combine the plurality of pieces of the biomass slurry feedstock and the fluid within the vessel to form the biomass slurry. The mixing apparatus can further include an output to the vessel, where the output is configured to deliver the biomass slurry to a conveyance system for the subterranean injection.

In yet another aspect, the disclosure relates to a mixing apparatus for preparing a biomass slurry for subterranean injection The mixing apparatus can include a vessel and a first input to the vessel, where the first input is configured to receive a plurality of pieces of a biomass slurry feedstock, and where each of the plurality of pieces has a size not to exceed approximately 60,000 μm. The mixing apparatus can also include a second input to the vessel, where the second input is configured to receive a fluid to the vessel, and where the fluid has a salt content of at least approximately 0.05%. The mixing apparatus can further include a mixer configured to combine the plurality of pieces of the biomass slurry feedstock and the fluid within the vessel to form the biomass slurry. The mixing apparatus can also include an output to the vessel, where the output is configured to deliver the biomass slurry to a conveyance system for the subterranean injection.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1A:
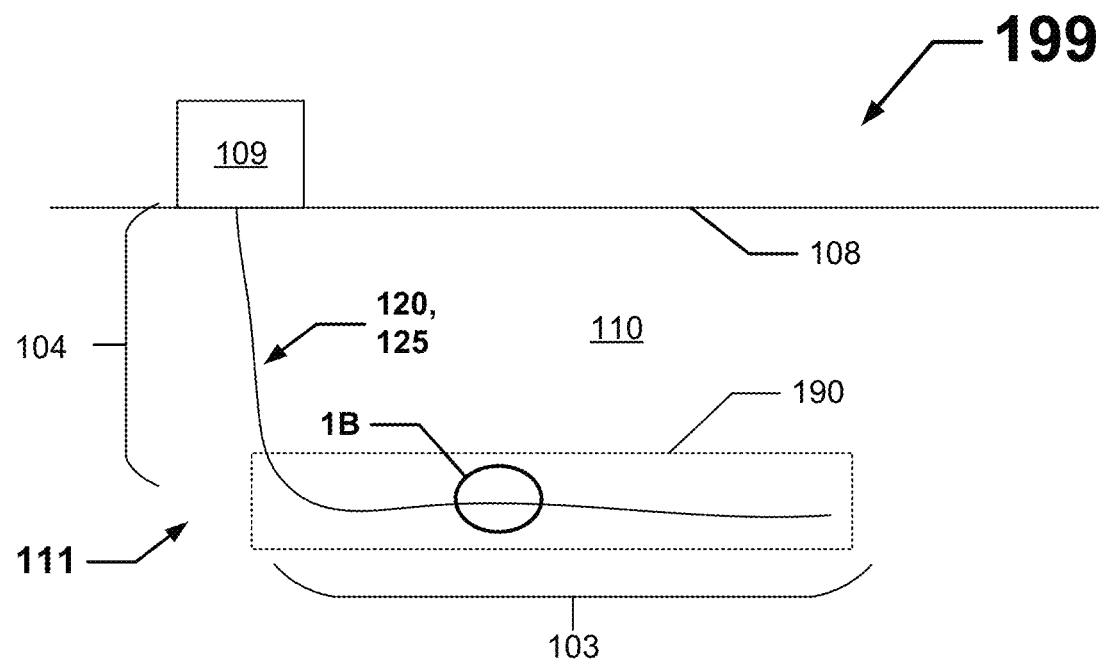
FIGS. 1A and 1B show a subterranean field system into which a biomass slurry produced using example embodiments may be injected.

The example embodiments discussed herein are directed to systems, methods, and devices for biomass slurry preparation for subterranean injection and storage for the purpose of removing biogenic carbon from the terrestrial carbon cycle, thereby reducing the rate of climate change. Wellbores into which a biomass slurry prepared by example embodiments may be injected may be land-based (out of water) or subsea. Example embodiments of biomass slurry preparation systems may be rated for use in marine, corrosive, and/or hazardous environments. A wellbore used for injecting the biomass slurry created by example embodiments may be a newly drilled wellbore or an abandoned wellbore (e.g., for oil or gas production). The part of a subterranean formation into which the biomass slurry created by example embodiments may be injected may be a salt cavern, one or more other geological formations, or any combination thereof.

Example embodiments may provide a number of benefits including but not limited to generation of verifiable carbon removal credits in environmental markets, prevention of the release of greenhouse gases, disposal of solid wastes, and reduction in wildfire severity. For example, woody biomass waste is a large waste category in the United States. According to the U.S. Environmental Protection Agency, over 18 million tons of wood waste was generated as municipal solid waste (MSW) in 2018. Landfills received 12.2 million tons of that waste, which represented 8.3% of all municipal solid waste sent to landfills in that year. The remaining wood waste was recycled (in the amount of 3.1 million tons) or combusted to generate energy (in the amount of 2.8 million tons). In western North America, woody biomass is removed from forest landscapes to reduce the risk of severe wildfires, a practice known as fuel treatments. This non-merchantable wood waste is typically sent to biomass plants for energy generation, piled and burned, or chipped and left onsite.

Treated wood waste is considered a dangerous waste product that cannot be burned as fuel. This is due to the toxic chemicals and pesticides used to treat the wood. Such chemicals may include arsenic, copper, coal tar creosote, chromium, and pentachlorophenol, among others. Currently, treated wood waste that cannot be repurposed is landfilled. The typical wood waste disposal methods result in the short-term storage of solid biogenic carbon within the terrestrial carbon cycle, in which the carbon decomposes or is combusted and subsequently released to the atmosphere as greenhouse gases (GHGs), mainly $CO_2$. Biomass slurry formation using saline solutions to slow or halt microbial and fungal activity (as described herein using example embodiments), and subsequent underground injection of the biomass slurry in stable formations represents an alternative waste disposal method that can divert MSW from landfills, safely handle treated wood waste, and permanently sequester its biogenic carbon content in geological timescales, thereby removing $CO_2$ from the atmosphere.

Example embodiments of biomass slurry preparation systems can be designed to comply with certain standards and/or requirements. Examples of entities that set such standards and/or requirements can include, but are not limited to, the Society of Petroleum Engineers, the American Petroleum Institute (API), the International Standards Organization (ISO), and the Occupational Safety and Health Administration (OSHA). Also, as discussed above, example embodiments for biomass slurry preparation systems may be used in marine, corrosive, and/or hazardous environments, and so example embodiments for biomass slurry preparation systems may be designed to comply with industry standards that apply to marine, corrosive, and/or hazardous environments.

The use of the terms "about", "approximately", and similar terms applies to all numeric values, whether or not explicitly indicated. These terms generally refer to a range of numbers that one of ordinary skill in the art would consider as a reasonable amount of deviation to the recited numeric values (i.e., having the equivalent function or result). For example, this term may be construed as including a deviation of ±10 percent of the given numeric value provided such a deviation does not alter the end function or result of the value. Therefore, in such a case, a value of about 1% may be construed to be a range from 0.9% to 1.1%. Furthermore, a range may be construed to include the start and the end of the range. For example, a range of 10% to 20% (i.e., range of 10%-20%) may include 10% and/or may include 20%, and includes percentages in between 10% and 20%, unless explicitly stated otherwise herein. Similarly, a range of between 10% and 20% (i.e., range between 10%-20%) may include 10% and/or may include 20%, and includes percentages in between 10% and 20%, unless explicitly stated otherwise herein.

The use of the term "substantially" refers to all or mostly all. For example, when discussing a biomass slurry, pieces of biomass may be described as being substantially evenly distributed within a fluid. In this context, substantially may be, for example, some amount (e.g., 75%, 85%, 90%) less than 100% to allow for some pockets of the biomass slurry where there is a higher concentration of the pieces of biomass relative to the fluid and/or other pockets of the biomass slurry where there is a lower concentration of the pieces of biomass relative to the fluid. In other words, use of the term "substantial" allows for the realistic possibility that the pieces of the biomass may not be 100% evenly distributed within a fluid for a volume of biomass slurry.

A "subterranean formation" refers to practically any volume under a surface. For example, it may be practically any volume under a terrestrial surface (e.g., a land surface), practically any volume under a seafloor, etc. Each subsurface volume of interest may have a variety of characteristics, such as petrophysical rock properties, reservoir fluid properties, reservoir conditions, hydrocarbon properties, or any combination thereof. For example, each subsurface volume of interest may be associated with one or more of: temperature, porosity, salinity, permeability, water composition, mineralogy, hydrocarbon type, hydrocarbon quantity, reservoir location, pressure, etc. Those of ordinary skill in the art will appreciate that the characteristics are many, including, but not limited to: shale gas, shale oil, tight gas, tight oil, tight carbonate, carbonate, vuggy carbonate, unconventional formation (e.g., a permeability of less than 25 millidarcy (mD) such as a permeability of from 0.000001 mD to 25 mD)), diatomite, geothermal, mineral, etc.

The terms "formation", "subsurface formation", "hydrocarbon-bearing formation", "reservoir", "subsurface reservoir", "subsurface area of interest", "subsurface region of interest", "subsurface volume of interest", and the like may be used synonymously. The term "subterranean formation" is not limited to any description or configuration described herein. As used herein, terms such as "preparing" (including variants such as "preparation") and "processing" when applied to the various ingredients or components (e.g., biomass, fluids, additives) of the biomass slurry and/or to the biomass slurry itself may be used interchangeably.

A "well" or a "wellbore" refers to a single hole, usually cylindrical, that is drilled into a subsurface volume of interest. A well or a wellbore may be drilled in one or more directions. For example, a well or a wellbore may include a vertical well, a horizontal well, a deviated well, and/or other type of well. A well or a wellbore may be drilled in the subterranean formation for injection, exploration, and/or recovery of resources. Multiple wells (e.g., tens to hundreds of wells) or multiple wellbores, as from a pad, are often used in a field depending on the desired outcome.

A well or a wellbore may be drilled into a subsurface volume of interest using practically any drilling technique and equipment known in the art, such as geosteering, directional drilling, etc. Drilling the well may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling tools, wireline tools, logging-while-drilling (LWD) tools, or other downhole tools. After drilling to a predetermined depth, the drill string and the drill bit may be removed, and then the casing, the tubing, and/or other equipment may be installed according to the design of the well. The equipment to be used in drilling the well may be dependent on the design of the well, the subterranean formation, the hydrocarbons, and/or other factors.

A well may include multiple components, such as, but not limited to, a casing, a liner, a tubing string, a sensor, a packer, a screen, a gravel pack, artificial lift equipment (e.g., an electric submersible pump (ESP)), and/or other components. If a well is drilled offshore, the well may include one or more of the previous components plus other offshore components, such as a riser. A well may also include equipment to control fluid flow into the well, control fluid flow out of the well, or any combination thereof. For example, a well may include a wellhead, a choke, a valve, and/or other control devices. These control devices may be located on the surface, in the subsurface (e.g., downhole in the well), or any combination thereof.

In some embodiments, the same control devices may be used to control fluid flow into and out of the well. In some embodiments, different control devices may be used to control fluid flow into and out of a well. In some embodiments, the rate of flow of fluids through the well may depend on the fluid handling capacities of the surface facility that is in fluidic communication with the well. The equipment to be used in controlling fluid flow into and out of a well may be dependent on the well, the subsurface region, the surface facility, and/or other factors. Moreover, sand control equipment and/or sand monitoring equipment may also be installed (e.g., downhole and/or on the surface). A well may also include any completion hardware that is not discussed separately. The term "well" may be used synonymously with other terms known in the art, such as "borehole," "wellbore," or "well bore." The term "well" is not limited to any description or configuration described herein.

It is understood that when combinations, subsets, groups, etc. of elements are disclosed (e.g., combinations of components in a composition, combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components.

For example, in some embodiments, the item described could include only a component of type A. In some embodiments, the item described could include only a component of type B. In some embodiments, the item described could include only a component of type C. In some embodiments, the item described could include a component of type A and a component of type B. In some embodiments, the item described could include a component of type A and a component of type C. In some embodiments, the item described could include a component of type B and a component of type C.

In some embodiments, the item described could include a component of type A, a component of type B, and a component of type C. In some embodiments, the item described could include two or more components of type A (e.g., A1 and A2). In some embodiments, the item described could include two or more components of type B (e.g., B1 and B2). In some embodiments, the item described could include two or more components of type C (e.g., C1 and C2). In some embodiments, the item described could include two or more of a first component (e.g., two or more components of type A (A1 and A2)), optionally one or more of a second component (e.g., optionally one or more components of type B), and optionally one or more of a third component (e.g., optionally one or more components of type C).

In some embodiments, the item described could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described could include two or more of a first component (e.g., two or more components of type C (C1 and C2)), optionally one or more of a second component (e.g., optionally one or more components of type A), and optionally one or more of a third component (e.g., optionally one or more components of type B).

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of biomass slurry preparation systems will be described more fully hereinafter with reference to the accompanying drawings, in which example embodiments for biomass slurry preparation systems are shown. Example embodiments for biomass slurry preparation systems may, however, be embodied in many different forms and should not be construed as limited to the example embodiments set forth herein. Rather, these example embodiments are provided so that this disclosure will be thorough and complete, and will fully convey the scope of biomass slurry preparation systems to those of ordinary skill in the art. Like, but not necessarily the same, elements (also sometimes called components) in the various figures are denoted by like reference numerals for consistency.

Terms such as "first", "second", "primary," "secondary," "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. This list of terms is not exclusive. Such terms are not meant to denote a preference or a particular orientation, and they are not meant to limit embodiments of biomass slurry preparation systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
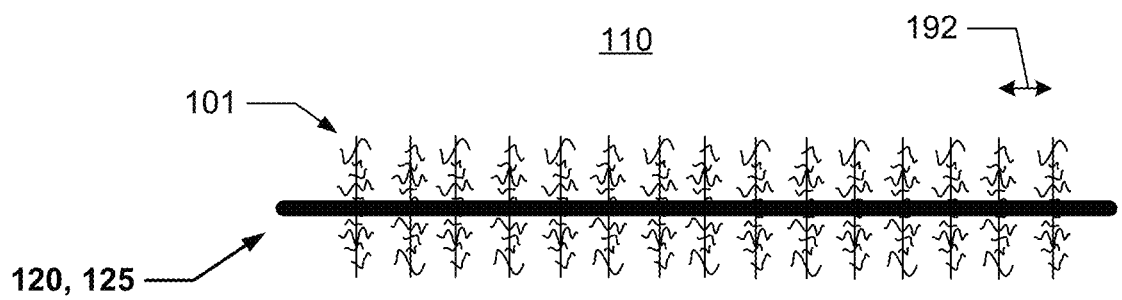
Figure 2:
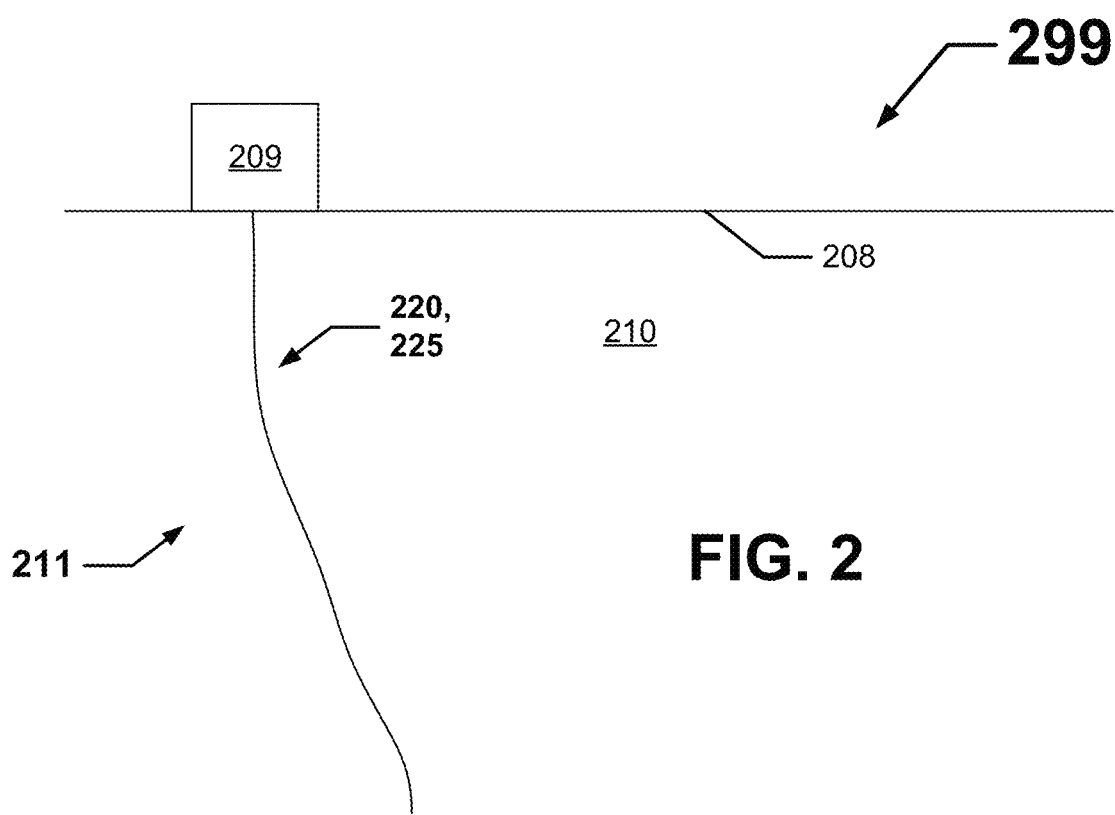
FIG. 2 shows another subterranean field system into which a biomass slurry produced using example embodiments may be injected.

FIGS. 1A and 1B show a subterranean field system 199 into which a biomass slurry produced using example embodiments may be injected. Specifically, FIG. 1A shows the subterranean field system 199 that includes a wellbore 111 with a horizontal section 103, and FIG. 1B shows a detailed view of part of the horizontal section 103 of the wellbore 111 shown in FIG. 1A. FIG. 2 shows another subterranean field system 299 into which a biomass slurry produced using example embodiments may be injected.

The field system 199 of FIGS. 1A and 1B includes a wellbore 111 disposed in a subterranean formation 110 using field equipment (e.g., a derrick, a tool pusher, a clamp, a tong, drill pipe, casing pipe, a drill bit, a wireline tool, a fluid pumping system) located above a surface 108 and within the wellbore 111. Once the wellbore 111 is drilled, a casing string 125 is inserted into the wellbore 111 to stabilize the wellbore 111. Subsequently, a tubing string 120 may be inserted inside of the casing string 125 to allow for the injection of a biomass slurry, generated by example embodiments and pumped downhole using biomass slurry injection equipment 109, into the subterranean formation 110.

Field equipment, located at the surface 108, is used to drill, encase, fracture, inject, and/or perform any other part of a field operation with respect to the wellbore 111. The wellbore 111 of FIG. 1A starts out with a substantially vertical section 104, and then has a substantially horizontal section 103. This configuration of the wellbore 111 is common for certain types of layers (e.g., shale and other tight formations) of subterranean formation 110. The biomass slurry injection equipment 109 is configured to pump a biomass slurry down a wellbore and into a subterranean formation. Examples of biomass slurry injection equipment 109 may include, but are not limited to, a pump, a motor, a compressor, a valve, a sensor device, a controller, piping, a regulator, and a power source.

Similarly, with respect to the field system 299 of FIG. 2, once the wellbore 211 is drilled, a casing string 225 is inserted into the wellbore 211 to stabilize the wellbore 211 from the subterranean formation 210. Subsequently, a tubing string 220 may be inserted inside of the casing string 225 to allow for the injection of a biomass slurry, generated by example embodiments and pumped downhole using biomass slurry injection equipment 209 (e.g., substantially similar to the biomass slurry injection equipment 109 discussed above), into the subterranean formation 210. Field equipment, located at the surface 208, is used to drill, encase, fracture, inject, and/or perform any other part of a field operation with respect to the wellbore 211. The wellbore 211 of FIG. 2 is substantially vertical. This configuration of the wellbore 211 is common for injection wells.

Referring back to FIGS. 1A and 2, the surface 108 may be ground level for an onshore application and the sea floor (or other similar floor under a body of water) for an offshore application. A body of water may include, but it not limited to, sea water, brackish water, flowback or produced water, wastewater (e.g., reclaimed or recycled), brine (e.g., reservoir or synthetic brine, a fluid with a high concentration of salts), fresh water (e.g., fresh water comprises <1,000 ppm TDS), any other type of water, or any combination thereof. For offshore applications, at least some of the field equipment may be located on a platform that sits above the water level. The point where the wellbore 111 begins at the surface 108 may be called the wellhead.

While not shown in FIGS. 1A and 2, there may be multiple wellbores 111, 211, each with its own wellhead but that is located close to the other wellheads, drilled into the subterranean formation 110, 210 and having substantially vertical sections (e.g., vertical section 104) and/or horizontal sections (e.g., horizontal section 103) that are close to each other. In such a case, the multiple wellbores 111, 211 may be drilled at the same pad or at different pads.

During the process of drilling the wellbore 111 of FIG. 1A, as detailed in FIG. 1B, the subterranean formation 110 adjacent to the wellbore 111 may include a number of fractures 101. While the subterranean formation 110 may have naturally-occurring fractures 101 and some fractures 101 may be created when drilling the wellbore 111, these fractures 101 may need to be enlarged and/or elongated, and additional fractures 101 may need to be created, in order to more effectively perform the field operation (e.g., inject a biomass slurry into the subterranean formation 110) from the subsurface. The fractures 101 are shown to be located in the horizontal section 103 of the wellbore 111 in FIGS. 1A and 1B. The fractures 101, whether created and/or naturally occurring, may additionally or alternatively be located in other sections (e.g., a substantially vertical section 104, a transition area between a vertical section 104 and a horizontal section 103) of the wellbore 111. In some cases, a wellbore 211 has no substantially horizontal sections, as shown in FIG. 2. A biomass slurry generated using example embodiments may be injected along any portion of a wellbore (e.g., wellbore 111, wellbore 211), regardless of whether fractures 101 are located in such portion.

The subterranean formation 110 and the subterranean formation 210 may include one or more of a number of formation types (e.g., in layers), including but not limited to shale, limestone, sandstone, clay, sand, and salt. In certain embodiments, the subterranean formation 110 and the subterranean formation 210 may include one or more reservoirs in which a biomass slurry may be injected. One or more of a number of field operations (e.g., fracturing (e.g., hydraulic fracturing), coring, tripping, drilling, setting casing, injecting a biomass slurry) may be performed to reach an objective of a user with respect to the subterranean formation 110 and the subterranean formation 210.

The wellbore 111 and the wellbore 211 may have one or more of a number of segments or hole sections, where each segment or hole section may have one or more of a number of dimensions. Examples of such dimensions may include, but are not limited to, a size (e.g., diameter) of the wellbore (e.g., wellbore 111, wellbore 211), a curvature of the wellbore, a true vertical depth of the wellbore, a measured depth of the wellbore, and a horizontal displacement of the wellbore. There may be multiple overlapping casing strings of various sizes (e.g., length, outer diameter) contained within and between these segments or hole sections to ensure the integrity of the wellbore construction. In FIG. 1A, one or more of the segments of the subterranean wellbore 111 are the substantially vertical section 104, while one or more of the other segments of the subterranean wellbore 111 are the substantially horizontal section 103. In FIG. 2, the segments of the subterranean wellbore 211 are substantially vertical sections.

As discussed above, inserted into and disposed within the wellbore 111 of FIG. 1A and the wellbore 211 of FIG. 2 are a number of casing pipes that are coupled to each other end-to-end to form the casing string 125 and the casing string 225, respectively. In these cases, each end of a casing pipe has mating threads (a type of coupling feature) disposed thereon, allowing a casing pipe to be directly or indirectly mechanically coupled to another casing pipe in an end-to-end configuration. The casing pipes of the casing string 125 and the casing string 225 may be indirectly mechanically coupled to each other using a coupling device, such as a coupling sleeve.

Each casing pipe of the casing string 125 and the casing string 225 may have a length and a width (e.g., outer diameter). The length of a casing pipe may vary. For example, a common length of a casing pipe is approximately 40 feet. The length of a casing pipe may be longer (e.g., 60 feet) or shorter (e.g., 10 feet) than 40 feet. The width of a casing pipe may also vary and may depend on the cross-sectional shape of the casing pipe. For example, when the shape of the casing pipe is cylindrical, the width may refer to an outer diameter, an inner diameter, or some other form of measurement of the casing pipe. Examples of a width in terms of an outer diameter may include, but are not limited to, 4½ inches, 7 inches, 7⅝ inches, 8⅝ inches, 10-¾ inches, 13-⅜ inches, and 14 inches.

The size (e.g., width, length) of the casing string 125 and the casing string 225 may be based on the information (e.g., diameter of the borehole drilled) gathered using field equipment with respect to the subterranean wellbore 111 and the subterranean wellbore 211, respectively. The walls of the casing string 125 and the casing string 225 have an inner surface that forms a cavity that traverses the length of the casing string 125 and the casing string 225. Each casing pipe may be made of one or more of a number of suitable materials, including but not limited to steel.

Once the wellbore 111, 211 (or a section thereof) is drilled, the casing string 125, 225 is inserted into the wellbore 111, 211 and subsequently cemented to the wellbore 111, 211 to stabilize the wellbore 111, 211 and allow for the injection of a biomass slurry into the subterranean formation 110 and the subterranean formation 210. For example, cement may be poured into the wellbore 111 through the cavity and then forced upward between the outer surface of the casing string 125 and the wall of the subterranean wellbore 111. Similarly, cement may be poured into the wellbore 211 through the cavity and then forced upward between the outer surface of the casing string 225 and the wall of the subterranean wellbore 211. In some cases, a liner may additionally be used with, or alternatively be used in place of, some or all of the casing pipes.

Referring to the field system 199 of FIGS. 1A and 1B, once the cement dries, a number of fractures 101 may be created in the subterranean formation 110. The fractures 101 may be created in any of a number of ways known in the industry, including but not limited to hydraulic fracturing, fracturing using electrodes, and/or other methods of generating fractures. The hydraulic fracturing process involves the injection of large quantities of fluids containing water, chemical additives, and proppant into the subterranean formation 110 from the wellbore 111 to create fracture networks. A subterranean formation 110 naturally has fractures 101, but these naturally occurring fractures 101 have inconsistent characteristics (e.g., length, spacing) and so in some cases cannot be relied upon for effective injection without having additional fractures 101, such as what is shown in FIG. 1B, created in the subterranean formation 110.

The various created fractures 101 that originate at the wellbore 111 and extend outward into the rock matrices in the subterranean formation 110 in this case have substantially consistent penetration lengths perpendicular to the wellbore 111 and have consistent coverage along at least a portion of the lateral length (substantially horizontal section) of the wellbore 111. For example, created fractures 101 may be 50 meters high and 200 meters long. Further, the created fractures 101 may be spaced a distance 192 apart from each other. The distance 192 (e.g., 25 meters, 5 meters, 12 meters) may be optimized based on the permeability and/or the porosity of the rock matrix of the subterranean formation 110.

The created fractures 101 create a volume 190 within the subterranean formation 110 where the rock matrix of the subterranean formation 110 is connected to the high conductivity fractures 101 located a short distance away. In addition to different configurations of the fractures 101, other factors that may contribute to the viability of the subterranean formation 110 may include, but are not limited to, permeability of the rock matrix, capillary pressure, and the temperature and pressure of the subterranean formation 110. Each fracture 101, whether created or naturally occurring, is defined by a wall, also called a fracture face. The fracture face provides a transition between the paths formed by the rock matrices in the subterranean formation 110 and the fracture 101. The injected biomass slurry may flow through the paths formed by the rock matrices in the subterranean formation 110 from the fracture 101.

Figure 3:
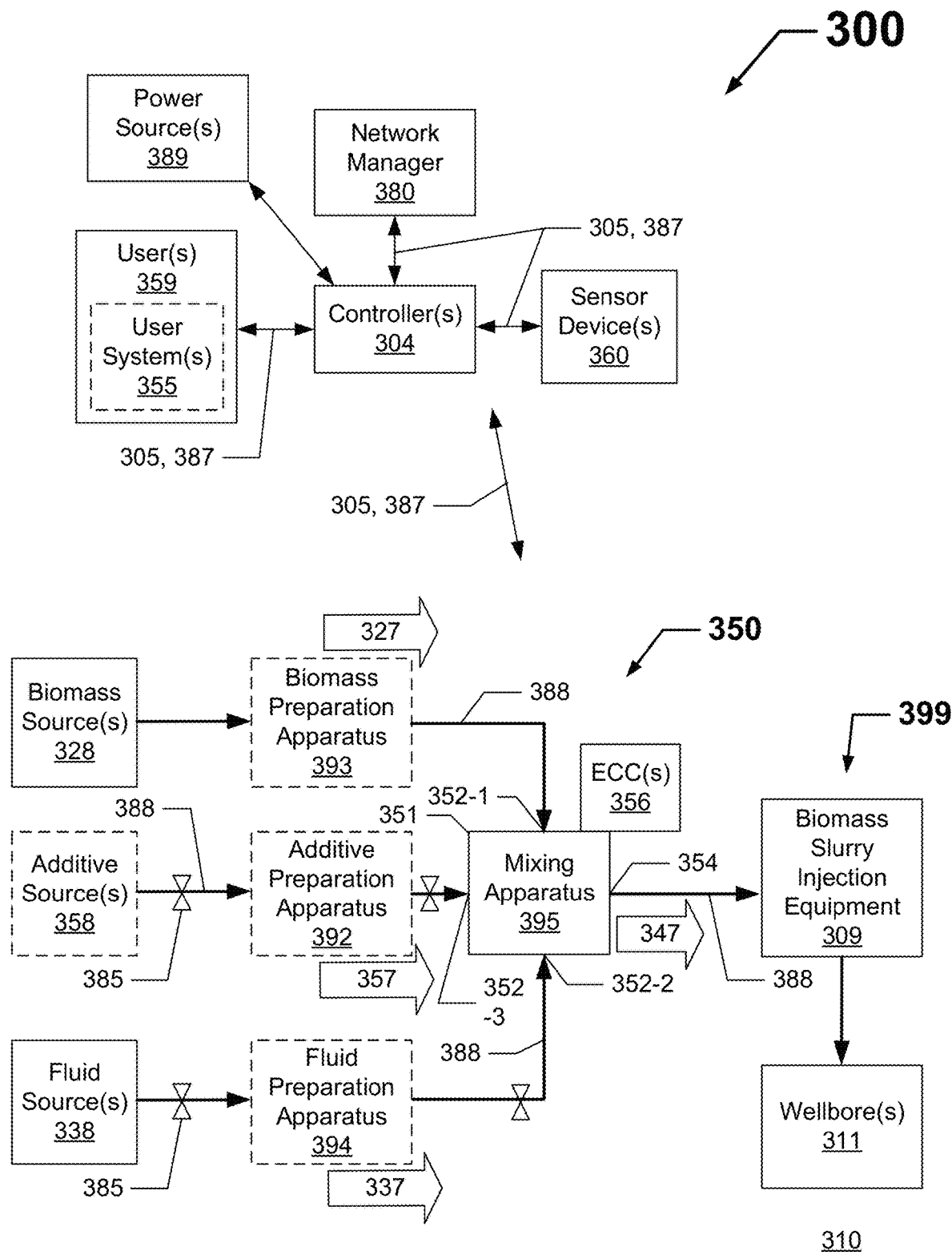
FIG. 3 shows a block diagram of an overall system that includes an example biomass slurry preparation system and a subterranean field system according to certain example embodiments.

FIG. 3 shows a block diagram of an overall system 300 that includes an example biomass slurry preparation system 350 and a subterranean field system 399 according to certain example embodiments. Referring to the description above with respect to FIGS. 1A through 2, the overall system 300 of FIG. 3 includes, in addition to the biomass slurry preparation system 350 and the subterranean field system 399, one or more biomass sources 328, an optional biomass preparation apparatus 393, one or more fluid sources 338, an optional fluid preparation apparatus 394, one or more controllers 304, one or more power sources 389, one or more sensor devices 360, one or more users 359 (including one or more optional user systems 355), and a network manager 380.

The example biomass slurry preparation system 350 includes a mixing apparatus 395, one or more valves 385, and part of a conveyance network 388. The field system 399 includes one or more wellbores 311 and biomass slurry injection equipment 309. The components shown in FIG. 3 are not exhaustive, and in some embodiments, one or more of the components shown in FIG. 3 may not be included in the overall system 300, for example, in order to simplify the drawing. Similarly, one or more components (e.g., a motor) not shown in FIG. 3 may be included in the overall system 300. Any component of the overall system 300 may be discrete or combined with one or more other components of the overall system 300. For example, a controller 304 may be combined with the mixing apparatus 395.

Also, one or more components of the overall system 300 (or portions thereof) may have different configurations. For example, a discrete controller 304 may be included with the biomass slurry preparation system 350. As another example, one or more of the sensor devices 360 may be disposed within or disposed on other components (e.g., the conveyance network 388, a valve 385, the mixing apparatus 395) of the biomass slurry preparation system 350.

The field system 399 of the overall system 300 of FIG. 3 may include one or more wellbores 311. Each of the wellbores 311 of the field system 399 may be substantially similar to the wellbores 111 and the wellbores 211 discussed above. Some or all of the wellbores 311 may be from a common pad. Over time, a wellbore 311 may be used for different purposes. For example, a wellbore 311 may be used as a production well at one time (e.g., prior to the time shown in FIG. 3), and at another time (e.g., as captured in FIG. 3), the wellbore 311 may be used as an injection well. In some cases, rather than being an abandoned or depleted production well, a wellbore 311 may be drilled and developed for the sole purpose of injection of a biomass slurry 347 (sometimes referred to herein more simply as a slurry 347) into a subterranean formation 310.

The biomass slurry feedstock 327 is one part of the biomass slurry 347 of FIG. 3. The biomass slurry feedstock 327 is at least partially in solid form. Specifically, the biomass slurry feedstock 327 may be in pieces of a certain size (e.g., diameter, length, width, height, circumference) or range of sizes (e.g., between 200 μm (micrometers or microns) to 50,000 μm with 50% in the range of 5,000 μm to 7,000 μm, between 200 μm to 50,000 μm with at least 40% greater than 450 μm, between 200 μm to 50,000 μm with at least 75% less than 25,000 μm, between 40 μm and 700 μm, between 150 μm and 750 μm, greater than 11 μm, at least 75% between 3,000 μm and 6,000 μm, between 100 μm and 6,000 μm with approximately 30% between 300 μm and 1,700 μm, between 10 μm and 1,100 μm, more than 50% between 63 μm and 500 μm). In some cases, the biomass slurry feedstock 327 may also have some amount of liquid (e.g., water, moisture) and/or gaseous content with the solid content. In certain example embodiments, the biomass slurry feedstock 327 is or includes a composite of cellulose in a lignin matrix and/or hemicellulose fibers in a lignin matrix, which may result in a high degree of preservability in terms of retaining carbon in solid form for subterranean sequestration. In some cases, the biomass slurry feedstock 327 may be or include an organic material having a natural composite of cellulose fibers in a lignin matrix and any associated engineered materials.

In some cases, the biomass slurry feedstock 327 is or includes any material (e.g., wood) having a composite of cellulose in a lignin matrix and/or hemicellulose fibers in a lignin matrix (referred to herein as "Biomass"). In some cases, the biomass slurry feedstock 327 includes Biomass in one or more forms of wood. The Biomass of the biomass slurry feedstock 327 may be or include untreated wood (e.g., as used for furniture (e.g., indoor furniture), as used for housing, as used for pallets), treated wood (e.g., tempered wood, chemically treated wood (e.g., as used for railroad ties, as used for utility poles, as used for decks, as used for furniture (e.g., indoor furniture, outdoor furniture), as used for housing, as used for landscaping, as used for garden beds, as used for fencing)), hardwoods, softwoods, or any combination thereof. In certain example embodiments, the biomass slurry feedstock 327 is mostly Biomass in the form of wood (e.g., at least 50% wood, at least 75% wood, at least 95% wood, at least 99% wood, at least 99.9% wood), but not 100%, wood. For example, the biomass slurry feedstock 327 may include amounts (e.g., less than 1%, less than 5%, less than 10%, less than 25%, less than 50%) of other non-Biomass (e.g., non-wood) products, including but not limited to metal (e.g., from nails, from screws, from brackets), dirt, plastic, algae, water, and vegetation (e.g., moss, grass, weeds, leaves).

Examples of Biomass of the biomass slurry feedstock 327 may include, but are not limited to, woody biomass, wood waste, logging debris (e.g., slash), sawmill residues, biomass removed for wildfire fuel treatments (e.g., for wildfire prevention), wildfire-damaged biomass, wind-damaged biomass, pulp and papermill waste sludge, black liquor, treated wood waste (e.g., used railroad ties, used utility poles, furniture, used fence pickets), non-recyclable paper products, construction and demolition wood waste, and non-recyclable pallet waste.

The biomass slurry feedstock 327 may originate from a single biomass source 328 or multiple biomass sources 328 at a point in time. The one or more types of biomass slurry feedstock 327 and/or the one or more biomass sources 328 that supply the biomass slurry feedstock 327 at a point in time may change over time. A biomass source 328 may be or include an original source (e.g., a forest, a wood farm, a lumber mill, a paper mill) of the biomass slurry feedstock 327 (or portion thereof, such as the Biomass) and/or a downstream source (e.g., an aggregator, a distributor) of the biomass slurry feedstock 327 (or portion thereof, such as the Biomass). A biomass source 328 may provide one or more types (e.g., lumber processing waste, waste from a pulp and paper mill, wood chips, whole tree branches) of the biomass slurry feedstock 327 (or portions thereof, such as the Biomass).

A biomass source 328 may be an original source (e.g., a forest, an orchard) of wood (or other type of Biomass or other type of biomass slurry feedstock 327) or some other source of wood (or other type of Biomass or other type of biomass slurry feedstock 327) that has been processed (e.g., chipped, treated) in some way. A biomass source 328 may be owned and/or operated by an entity that is the same as, or different than, the entity that controls the example biomass slurry preparation system 350. When there are multiple biomass sources 328, one biomass source 328 may be owned and/or operated by the same entity or a different entity that owns and/or operates one or more of the other biomass sources 328. Examples of a biomass source 328 may include, but are not limited to, a working forest, a nature preserve, a park, a tree plantation, a municipal source, a landfill or waste facility (e.g., specialized, general), and a collection site.

The biomass slurry feedstock 327 (or one or more portions thereof, such as some or all of the Biomass) is moved from a biomass source 328 to the optional biomass preparation apparatus 393 and/or the mixing apparatus 395 using a conveyance network 388. The conveyance network 388 can include any equipment and/or modes of transport so that some or all of the biomass slurry feedstock 327 is delivered to the optional biomass preparation apparatus 393 and/or the mixing apparatus 395. The conveyance network 388 can include any equipment that can transport the biomass slurry feedstock 327 (including components thereof, such as the Biomass), regardless of the state (e.g., solid, liquid, gas, a combination thereof) of the biomass slurry feedstock 327. Examples of such equipment may include, but are not limited to, pipes, tubes, valves (e.g., valves 385), storage tanks, pumps, motors, controllers (e.g., controller 304), sensor devices (e.g., sensor device 360), conveyor belts, trucks, rail systems, vibrating devices, mixers, agitators, flat boats, ultraviolet devices, shipping containers, refer containers, compressors, cranes, heaters, coolers, and dehumidifiers.

There may be a number of valves 385 placed directly or indirectly in-line with the piping and/or other portions of the conveyance network 388 to control the flow of the biomass slurry feedstock 327, the fluid 337, and/or other components that are delivered to the mixing apparatus 395. A valve 385 may have one or more of any of a number of configurations, including but not limited to a guillotine valve, a ball valve, a gate valve, a butterfly valve, a pinch valve, a needle valve, a plug valve, a diaphragm valve, and a globe valve. One valve 385 may be configured the same as or differently compared to another valve 385 in the example biomass slurry preparation system 350. Also, one valve 385 may be controlled (e.g., manually by a user 359, automatically by a controller 304) the same as or differently compared to another valve 385 in the biomass slurry preparation system 350. A valve 385 may be enclosed in a specialized housing for use in certain environments (e.g., hazardous). A valve 385 may be mounted to and/or integrated with the vessel 351 of the mixing apparatus 395.

The optional biomass preparation apparatus 393 is configured to process some or all of the biomass slurry feedstock 327 in some way before the biomass slurry feedstock 327 is introduced into the mixing apparatus 395. In this way, the biomass preparation apparatus 393 is configured to process the biomass slurry feedstock 327 in such a way that the biomass slurry feedstock 327 may be used as an input into the mixing apparatus 395. Such processing of the biomass slurry feedstock 327 may be or include, but is not limited to, drying, chemically treating, removing debris and/or other unwanted components (e.g., dirt, metals), grinding, chipping, mixing, milling, and agitating. For example, biomass slurry feedstock 327 that is or includes wood may be dried to a certain moisture mass fraction (e.g., less than 20%) in order to improve grinding performance. In such a case, drying by the biomass preparation apparatus 393 may target a range of thermal pre-treatment temperatures (e.g., between 50° C. and 150° C.). In addition, or in the alternative, biomass slurry feedstock 327 that is or includes wood may be ground in an aqueous environment to achieve smaller particle sizes. In such cases, preparation of the biomass slurry feedstock 327 using the biomass preparation apparatus 393 may depend on the grinder/mill type used onsite.

In certain example embodiments, the biomass slurry feedstock 327 (e.g., wood) may be pre-treated in a fluid 337 (e.g., an acid, a base, a liquid containing oxidizing agents to soften lignin, promote fiber separation, and/or reduce energy needs for grinding and/or milling) as part of the operation of the biomass preparation apparatus 393. Other operating conditions of the biomass preparation apparatus 393 may include, but are not limited to, torrefaction of the biomass slurry feedstock 327 and/or steam explosion applied to the biomass slurry feedstock 327.

In order to perform its one or more functions, the biomass preparation apparatus 393 may include any suitable equipment. Such equipment may include, but is not limited to, a heater, a blower, a mixer, an agitator, a chipper, a saw, a grinder, a mill, a sifter, a cooler, and a filter. When the biomass slurry feedstock 327 is fully prepared, whether or not through the use of the optional biomass preparation apparatus 393, the biomass slurry feedstock 327 is delivered to an input 352 (in this case, input 352-1) of the mixing apparatus 395 using the conveyance network 388. Each component of the conveyance network 388 may have an appropriate size (e.g., inner diameter, outer diameter, height, width) and be made of an appropriate material (e.g., steel, PVC) to safely and efficiently handle the pressure, temperature, mass, and other characteristics of the biomass slurry feedstock 327 transported thereby.

The biomass preparation apparatus 393 may have a single stage or multiple stages (e.g., drying, chemically treating, grinding, milling). In addition, or in the alternative, the biomass preparation apparatus 393 may be located at a single facility and/or location, or distributed over multiple facilities and/or locations. The biomass preparation apparatus 393 may be owned and/or operated by an entity that is the same as, or different than, the entity that controls the example biomass slurry preparation system 350. When there are multiple stages and/or locations of the biomass preparation apparatus 393, one stage or location may be owned and/or operated by the same entity or a different entity that owns and/or operates one or more of the other stages or locations. Some or all of the biomass preparation apparatus 393 may be part of the example biomass slurry preparation system 350.

Some or all of the operation of the biomass preparation apparatus 393 may be controlled by a controller 304 (discussed below). In such a case, the controller 304 may base some or all of its control on measurements, captured by one or more sensor devices 360 (discussed below), of one or more parameters (e.g., weight, size of each piece of the biomass slurry feedstock 327, temperature, moisture content, volume) associated with the biomass slurry feedstock 327. The controller 304 may be in communication with or may be part of the controller 304 of the mixing apparatus 395, discussed below. Some or all of the biomass preparation apparatus 393 may operate on a continuous basis or in discrete periods or intervals of time.

Whether there is a biomass preparation apparatus 393 or not, the biomass slurry feedstock 327 that is input into the mixing apparatus 395 is prepared in a certain way. For example, each of the pieces of the biomass slurry feedstock 327 that is input into the mixing apparatus 395 may have a certain size or be within a range of sizes (e.g., between approximately 0.01 μm and approximately 60,000 μm, no greater than approximately 950 μm, between approximately 2 μm and approximately 650 μm). As another example, the biomass slurry feedstock 327 may have an amount of chemically treated material that falls within a range (e.g., between 0% and 40%, no more than 75%, between 10% and 60%) relative to the rest of the biomass slurry feedstock 327 that is chemically untreated.

The fluid 337 is another part of the biomass slurry 347 of FIG. 3. The fluid 337 is at least partially in liquid form. In some cases, the fluid 337 may also have some amount of solid (e.g., sediment, scale) and/or gaseous content with the fluid content. In certain example embodiments, the fluid 337 is or includes water. In some cases, the fluid 337 is mostly (e.g., at least 50%, at least 75%, at least 95%, at least 99%), but not 100%, water. For example, the fluid 337 may include amounts (e.g., less than 1%, less than 5%, less than 10%, less than 25%, less than 50%) of other non-water fluids and/or solids, including but not limited to scale, sediment, algae, mud, hydrogen sulfide, sulfur oxide, carbon dioxide, nitrogen oxide, hydrogen halide, charged ions, an acidic liquid, and a basic liquid.

Examples of the fluid 337 may include, but are not limited to, drilling waste and wastewater (e.g., from drilling a wellbore in a subterranean formation), produced water (e.g., co-produced with oil and/or natural gas from a subterranean formation), brackish water, brine, saline water, municipal wastewater, chlor-alkali waste, acid rock and/or mine drainage, industrial wastewater (e.g., water produced from mining, textile mills, leather tanneries, chemical and/or pharmaceutical plants, food and/or beverage manufacturing, ethanol production, sawmills, pulp and paper mills, desalination plants, etc.), commercial wastewater (e.g., water produced from salons, auto body repair shops, restaurants, healthcare facilities (e.g., hospitals, clinics), etc.), nutrient retention pond water, landfill leachate, power plant wastewater (e.g., as from coal or nuclear fueled power plants, cooling tower effluent, boiler effluent).

In some cases, the fluid 337 may include a chemical additive 357 (discussed below). Examples of such a chemical additive may include, but are not limited to, a corrosion inhibitor (e.g., anodic inhibitors (e.g., chromates, nitrites, phosphates, benzoates, molybdates), cathodic inhibitors (e.g., zinc ions, polyphosphates, phosphonates), mixed inhibitors (e.g., a combination of anodic and cathodic inhibitors), film-forming organic inhibitors (e.g., amino acids), oxygen absorbers (e.g., sulfites, hydrazine, hydroquinone)), a surfactant (e.g., anionic surfactant (e.g., carboxylates, phosphates, sulfates, sulfonates), cationic surfactant (e.g., amines), ampholytic surfactant (e.g., cationic and anionic centers attached to the same molecule), non-ionic surfactant (e.g., fatty alcohol ethoxylate, alkyl phenol ethoxylate, fatty acid alkoxylate)), an acid, a base, a charged ionic fluid.

The fluid 337 originates from one or more fluid sources 338. The fluid 337 may originate from a single fluid source 338 or multiple fluid sources 338 at a point in time. The fluid 337 at a point in time may have a single chemical formulation (e.g., a single fluid) or multiple chemical formulations (e.g., multiple fluids). The one or more fluids that make up the fluid 337 and/or the one or more fluid sources 338 that supply the fluid 337 at a point in time to the mixing apparatus 395 may change over time. A fluid source 338 may be or include an original source (e.g., a lake, a river, a subterranean wellbore, a pond) of the fluid 337 (or portion thereof) and/or a downstream source (e.g., a tank, a vessel) of the fluid 337 (or portion thereof). A fluid source 338 may provide one or more types (e.g., brackish water, fresh water, formation water, an acid, a base) of fluid 337.

A fluid source 338 may be an original source (e.g., a lake, a pond) of a fluid 337 or some other source of a fluid 337 that has been processed (e.g., treated wastewater, desalinated water) in some way. A fluid source 338 may be owned and/or operated by an entity that is the same as, or different than, the entity that controls the example biomass slurry preparation system 350. When there are multiple fluid sources 338, one fluid source 338 may be owned and/or operated by the same entity or a different entity that owns and/or operates one or more of the other fluid sources 338. Examples of a fluid source 338 may include, but are not limited to, a wellbore, a pond, a lake, an ocean, a river, a water processing facility (e.g., a wastewater treatment plant, a slaughterhouse, a desalination plant), a water reuse storage tank or facility, a chemical plant, a chemical storage tank, and a municipal facility.

The fluid 337 (or one or more portions thereof) is moved from a fluid source 338 to the optional fluid preparation apparatus 394 and/or the mixing apparatus 395 using the conveyance network 388. The conveyance network 388 in this case may mostly or entirely include piping. The piping of the conveyance network 388 may include multiple pipes, ducts, elbows, joints, sleeves, collars, and similar components that are coupled to each other (e.g., using coupling features such as mating threads) to establish a network for transporting the fluid 337 from a fluid source 338 to the mixing apparatus 395. Each component of the piping of the conveyance network 388 may have an appropriate size (e.g., inner diameter, outer diameter) and be made of an appropriate material (e.g., steel, PVC) to safely and efficiently handle the pressure, temperature, flow rate, and other characteristics of the fluid 337 that flows therethrough.

The conveyance network 388 may include any equipment and/or modes of transport so that some or all of the fluid 337 is delivered to the optional fluid preparation apparatus 394 and/or the mixing apparatus 395. The conveyance network 388 can include any equipment that can transport the fluid 337 (including components thereof), regardless of the state (e.g., solid, liquid, gas, a combination thereof) of the fluid 337. Examples of such equipment (in addition to the piping discussed above) may include, but are not limited to, valves (e.g., valves 385), storage tanks, pumps, motors, controllers (e.g., controller 304), sensor devices (e.g., sensor device 360), conveyor belts, trucks, rail systems, vibrating devices, mixers, agitators, tanker vessels, ultraviolet devices, shipping containers, refer containers, compressors, cranes, fans, blowers, dust collectors, heaters, coolers, and dehumidifiers. Some or all of the conveyance network 388 may operate on a continuous basis or in discrete periods or intervals of time.

The optional fluid preparation apparatus 394 is configured to process some or all of the fluid 337 in some way before the fluid 337 is introduced into the mixing apparatus 395. In this way, the fluid preparation apparatus 394 is configured to process the fluid 337 in such a way that the fluid 337 may be used as an input into the mixing apparatus 395. Such processing of the fluid 337 may be or include, but is not limited to, chemically treating, filtering, changing the pH, changing the viscosity, mixing, and agitating. In order to perform its one or more functions, the fluid preparation apparatus 394 may include any suitable equipment. Such equipment may include, but is not limited to, a heater, a mixer, an agitator, a strainer, a cooling tower, and a filter. When the fluid 337 is fully prepared, whether or not through the use of the optional fluid preparation apparatus 394, the fluid 337 is delivered to another input 352 (in this case, input 352-2) of the mixing apparatus 395.

The fluid preparation apparatus 394 may have a single stage or multiple stages (e.g., mixing, heating, cooling, aerating). In addition, or in the alternative, the fluid preparation apparatus 394 may be located at a single facility and/or location, or distributed over multiple facilities and/or locations. The fluid preparation apparatus 394 may be owned and/or operated by an entity that is the same as, or different than, the entity that controls the example biomass slurry preparation system 350. When there are multiple stages and/or locations of the fluid preparation apparatus 394, one stage or location may be owned and/or operated by the same entity or a different entity that owns and/or operates one or more of the other stages or locations. Some or all of the fluid preparation apparatus 394 may be part of the example biomass slurry preparation system 350.

Some or all of the operation of the fluid preparation apparatus 394 may be controlled by a controller 304 (discussed below). In such a case, the controller 304 may base some or all of its control on measurements, captured by one or more sensor devices 360 (discussed below), of one or more parameters (e.g., flow rate, chemical composition, temperature, volume, pressure) associated with the fluid 337. The controller 304 may be in communication with or may be part of the controller 304 of the mixing apparatus 395, discussed below. Some or all of the fluid preparation apparatus 394 may operate on a continuous basis or in discrete periods or intervals of time.

Whether there is a fluid preparation apparatus 394 or not, the fluid 337 that is input into the mixing apparatus 395 is prepared in a certain way. For example, the fluid 337 that is input into the mixing apparatus 395 may have a certain value or range of values with respect to characteristics that include, but are not limited to, viscosity (e.g., between 0.25 cP and 1.25 cP, less than 1.3 cP, greater than 0.18 cP, between 0.7 cP and 1.1 cP, between 0.4 cP and 0.95 cP, less than 4.0 cP), pH (e.g., between 2.0 and 12.0, between 2.0 and 6.0, between 8.0 and 13.0, between 5.3 and 8.4, between 3.1 and 5.4, between 7.5 and 9.5, between 2.0 and 3.9, between 4 and 6.9, between 7.1 and 10, between 10.1 and 12.5, between 6.9 and 7.1), concentration, chemical composition (e.g., a salt content of at least approximately 0.05%, a salt content between 0.05% and 3.5%, a salt content between 0.2% and 0.8%, a salt content between 0.3% and 2.0%, a salt content between 1.0% and 4.0%, a salt content between 3.5% and 5.0%, a salt content between 1.5% and 6%, a salt between 5.2% and 7.0%, a salt content between 5.0% and 28.0%, a salt content between 0.05% and 28.0%), and temperature.

Whether naturally part of a fluid 337 (e.g., brine, brackish water, saline water, sea water) or in the form of an additive 357 (discussed below), salt in the fluid 337 may slow or inhibit bacterial and/or fungal activity in the biomass slurry feedstock 327 (e.g., Biomass), thereby preserving the solid carbon in the biomass slurry feedstock 327 and preventing or limiting the generation of $CO_2$ and/or $CH_4$ within the underground storage reservoirs in the subterranean formation 311 where the biomass slurry 347 is deposited. Using salt in the fluid 337 and/or the biomass slurry 347 increases carbon permanence and reduces leakage risks.

One or more additives 357 are another optional part of the biomass slurry 347 of FIG. 3. An additive 357 may be in liquid, solid, and/or gaseous form. An additive 357 is configured to alter a property (e.g., the viscosity, the pH, the density, alkalinity) of the biomass slurry 347 when the additive 357 is added to the biomass slurry feedstock 327 and the fluid 337 in the vessel 351 of the mixing apparatus 395.

Examples of an additive 357 may include, but are not limited to, oily viscous fluids (e.g., byproducts from oilfield operations (e.g., tank bottoms, pit materials, and oily sludge)), hydrate suppressants, bactericides, alkalis, scale inhibitors, surfactants, lubricant freeing agents, calcium reducers, defoamers, surface active agents, emulsifiers, temperature stability agents, filtrate reducers, thinners, dispersants, flocculants, viscosifiers (e.g., cellulosics and/or other cellulose material), foaming agents, weight control material, corrosion inhibitors (e.g., anodic inhibitors (e.g., chromates, nitrites, phosphates, benzoates, molybdates), cathodic inhibitors (e.g., zinc ions, polyphosphates, phosphonates), mixed inhibitors (e.g., a combination of anodic and cathodic inhibitors), film-forming organic inhibitors (e.g., amino acids), oxygen absorbers (e.g., sulfites, hydrazine, hydroquinone)), surfactants (e.g., anionic surfactant (e.g., carboxylates, phosphates, sulfates, sulfonates), cationic surfactant (e.g., amines), ampholytic surfactant (e.g., cationic and anionic centers attached to the same molecule), non-ionic surfactant (e.g., fatty alcohol ethoxylate, alkyl phenol ethoxylate, fatty acid alkoxylate)), an acid, a base, and a charged ionic fluid.

Use of an amount and/or type of additive 357 may be based on one or more of a number of factors. For example, if an additive 357 is a corrosion inhibitor, the type and amount of corrosion inhibitor used may depend on such non-comprehensive factors as type(s) of metal present, environmental conditions (e.g., temperature, pressure) in the mixing apparatus 395 and/or in the subterranean formation 310, chemical composition of the fluid 337 and/or the biomass slurry feedstock 327, and compatibility with one or more characteristics (e.g., viscosity, density) of the biomass slurry 347. As another example, an additive 357 may be or include a surfactant to help lower the viscosity of the biomass slurry 347 (e.g., to increase slurry throughput, to reduce pumping energy requirements, to decrease water needs). As discussed above, an additive 357 may be added to a fluid 337 using the fluid preparation apparatus 394, added to some or all of the biomass slurry feedstock 327 using the biomass preparation apparatus 393, and/or combined with the biomass slurry feedstock 327 and the fluid 337 in the vessel 351 of the mixing apparatus 395.

An additive 357 originates from one or more additive sources 358. An additive 357 may originate from a single additive source 358 or multiple additive sources 358 at a point in time. An additive 357 at a point in time may have a single chemical formulation (e.g., a single additive) or multiple chemical formulations (e.g., multiple additives). The one or more additives that make up an additive 357 and/or the one or more additive sources 358 that supply an additive 357 at a point in time to the mixing apparatus 395 may change over time. An additive source 358 may be or include an original source (e.g., a manufacturing process) of the additive 357 (or portion thereof) and/or a downstream source (e.g., a tank, a vessel) of the additive 357 (or portion thereof). An additive source 358 may provide one or more types (e.g., corrosion inhibitors, oils,) of additive 357.

An additive source 358 may provide an original (e.g., raw, unprocessed) version of an additive 357 or a processed (e.g., filtered, separated, aerated, dried) version of an additive 357. An additive source 358 may be owned and/or operated by an entity that is the same as, or different than, the entity that controls the example biomass slurry preparation system 350. When there are multiple additive sources 358, one additive source 358 may be owned and/or operated by the same entity or a different entity that owns and/or operates one or more of the other additive sources 358. Examples of an additive source 358 may include, but are not limited to, a manufacturer, a distributor, a consultant, a government entity, a wholesaler, and a retailer.

An additive 357 (or one or more portions thereof) is moved from an additive source 358 to the optional additive preparation apparatus 392 and/or the mixing apparatus 395 using the conveyance network 388. This portion of the conveyance network 388 may include any equipment that can transport and monitor each additive 357 (including components thereof), regardless of the state (e.g., solid, liquid, gas, a combination thereof) of the additive 357. Examples of such equipment may include, but are not limited to, pipes, tubes, valves (e.g., valves 385), storage tanks, pumps, motors, controllers (e.g., controller 304), sensor devices (e.g., sensor device 360), conveyor belts, trucks, rail systems, vibrating devices, mixers, agitators, flat boats, ultraviolet devices, shipping containers, refrigerated containers, compressors, cranes, heaters, coolers, and dehumidifiers. Some or all of the conveyance network 388 may operate on a continuous basis or in discrete periods or intervals of time.

The optional additive preparation apparatus 392 is configured to process some or all of the additives 357 in some way before the additives 357 are introduced into the mixing apparatus 395. In this way, the additive preparation apparatus 392 is configured to process each additive 357 in such a way that the additive 357 may be used as an input into the mixing apparatus 395. Such processing of the additives 357 may be or include, but is not limited to, chemically treating, filtering, changing the pH, heating, cooling, removing moisture, changing the viscosity, mixing, and agitating. In order to perform its one or more functions, the additive preparation apparatus 392 may include any suitable equipment. Such equipment may include, but is not limited to, a heater, a chiller, a heat exchanger, a dehumidifier, an aerator, a blower, a mixer, an agitator, a chipper, a grinder, a mill, a filter, and a sifter. When an additive 357 is fully prepared, whether or not through the use of the optional additive preparation apparatus 392, the additive 357 is delivered to another input 352 (in this case, input 352-3) of the mixing apparatus 395. In alternative embodiments, an additive 357 may be combined with the fluid 337 (or a portion thereof) prior to the combination of the additive 357 and the fluid 337 (or portion thereof) being introduced into the vessel 351 of the mixing apparatus 395.

The additive preparation apparatus 392 may have a single stage or multiple stages (e.g., mixing, heating, cooling, aerating). In addition, or in the alternative, the additive preparation apparatus 392 may be located at a single facility and/or location, or distributed over multiple facilities and/or locations. The additive preparation apparatus 392 may be owned and/or operated by an entity that is the same as, or different than, the entity that controls the example biomass slurry preparation system 350. When there are multiple stages and/or locations of the additive preparation apparatus 392, one stage or location may be owned and/or operated by the same entity or a different entity that owns and/or operates one or more of the other stages or locations. Some or all of the additive preparation apparatus 392 may be part of the example biomass slurry preparation system 350.

Some or all of the operation of the additive preparation apparatus 392 may be controlled by a controller 304 (discussed below). In such a case, the controller 304 may base some or all of its control on measurements, captured by one or more sensor devices 360 (discussed below), of one or more parameters (e.g., flow rate, chemical composition, temperature, volume, pressure) associated with an additive 357. The controller 304 may be in communication with or may be part of the controller 304 of the mixing apparatus 395, discussed below. Some or all of the additive preparation apparatus 392 may operate on a continuous basis or in discrete periods or intervals of time.

Whether there is an additive preparation apparatus 392 or not, an additive 357 that is input into the mixing apparatus 395 is prepared in a certain way. For example, an additive 357 that is input into the mixing apparatus 395 may have a certain value or range of values with respect to characteristics that include, but are not limited to, viscosity, density, pH, concentration, chemical composition, and temperature.

The mixing apparatus 395 of the example biomass slurry preparation system 350 is configured to receive the biomass slurry feedstock 327, the fluid 337, and any other components (e.g., one or more additives) into a vessel 351. Specifically, the vessel 351 has multiple inputs 352 for receiving the biomass slurry feedstock 327, the fluid 337, and any other components via parts of the conveyance network 388. The mixing apparatus 395 then mixes all of these components in the vessel 351 to create a biomass slurry 347, which may then be output to biomass slurry injection equipment 309 for injection into one or more wellbores 311. Specifically, the vessel 351 has one or more outputs 354 for delivering the biomass slurry 347 to the biomass slurry injection equipment 309 via part of the conveyance network 388. The mixing apparatus 395 and some or all of its various components (e.g., the environmental control components 356) may operate on a continuous basis or in discrete periods or intervals of time.

In certain example embodiments, the vessel 351 of the mixing apparatus 395 is a passive object that receives the biomass slurry feedstock 327, the fluid 337, and any other components without the vessel 351 being modified or a user 359 taking action during this process. In such a case, a controller 304 may control various aspects (e.g., temperature, pressure, flow rate, mixing rate, mixing method) of the biomass slurry feedstock 327, the fluid 337, any other components, and/or the vessel 351 using environmental control components 356 (sometimes abbreviated herein as ECCs, as shown in FIG. 3). In certain example embodiments, a controller 304 (e.g., external to the mixing apparatus 395, internal to the mixing apparatus 395) is designed to control one or more environmental control components 356 of the mixing apparatus 395 in order to achieve a biomass slurry 347 having certain characteristics (e.g., a certain viscosity or range of viscosities, a certain pH or range of pHs, a certain density or range of densities, a certain salt content or range of salt contents). In addition, or in the alternative, one or more of the environmental control components 356 may be controlled manually (e.g., by a user 359).

In some cases, some or all of the mixing apparatus 395 may be operated based on measurements, made by one or more sensor devices 360, of one or more parameters associated with the biomass slurry feedstock 327, the fluid 337, any other components, the environmental control components 356, and/or the vessel 351. Each sensor device 360 of the mixing apparatus 395 (as well as the rest of the overall system 300) includes one or more sensors that measure one or more parameters (e.g., pressure, flow rate, temperature, humidity, depth, location, content of the fluid 337, sizes of the pieces of biomass slurry feedstock 327, composition of the biomass slurry feedstock 327, weight, volume, chemical composition of an additive 357, voltage, electrical current, viscosity of the biomass slurry 347, etc.). Examples of a sensor of a sensor device 360 may include, but are not limited to, a temperature sensor, a flow sensor, a pressure sensor, a gas spectrometer, a voltmeter, an ammeter, a gyroscope, a spectrograph, a gas chromatograph, a load cell, a viscometer, and a camera. A sensor device 360 may be a stand-alone device or integrated with another component of the mixing apparatus 395 (or other part of the overall system 300).

For example, the mixing apparatus 395 may be configured to generate a biomass slurry 347 having a specific gravity that falls within a range (e.g., between 1.00 and 1.10, between 0.95 and 1.03), a density that falls within a range (e.g., between 1 g/cm$^3$ and 2.7 g/cm$^3$, between 0.5 g/cm$^3$ and 2.3 g/cm$^3$), a certain range of solids to fluids (e.g., between 5% and 75%, between 25% and 60%), a viscosity that falls within a range (e.g., between 15 cP and 10,000 cP, between 50 cP and 500 cP, greater than 3.0 cP, between 150 cP and 2,000 cP, less than 20,000 cP). The environmental control components 356 of the mixing apparatus 395 may be used, at least in part, to generate a biomass slurry 347 that has the desired characteristics.

Examples of environmental control components 356 of the mixing apparatus 395 may include, but are not limited to, a motor, a pump, a filter, a centrifuge, a compressor, a condenser, a vibrating device, a funnel, a strainer, a separator, an agitator, a paddle, a circulating system, an aerator, a baffle, a column, a separator, a mixer (e.g., a centrifuge mixer, a desander, a tumbler mixer, a homogenizer, a static mixer, a drum mixer, a fluidization mixer, agitator mixers, paddle mixers, an emulsifier, a pail mixer, a convective mixer, a batch mixer, and a ribbon mixer), piping, a valve (e.g., valve 385), a fan, a blower, a heater, a heat exchanger, and a cooler.

When the mixing apparatus 395 includes multiple environmental control components 356, these components or pieces of equipment may operate in series and/or in parallel with each other. An environmental control component 356 may be positioned and/or configured to operate within the vessel 351, on a wall of the vessel 351, external to the vessel 351 (e.g., abutting against a wall of the vessel 351), or at some other location with respect to the vessel 351. A controller 304 may also use measurements made by one or more sensor devices 360 to drive control decisions made by the controller 304 with respect to the environmental control components 356 of the mixing apparatus 395 of the biomass slurry preparation system 350.

The vessel 351 of the mixing apparatus 395 may have any shape, size, material, and/or other configuration suitable to create the biomass slurry 347 therein. Similarly, the environmental control components 356 of the mixing apparatus 395 may be configured to function in light of the configuration of the vessel 351. For example, the vessel 351 of the mixing apparatus 395 may have an elongated tubular shape, and an environmental control component 356 of the mixing apparatus 395 may be an elongated spiral screw that rotates within the vessel 351 to mix the biomass slurry feedstock 327, the fluid 337, and any other components to form the biomass slurry 347. As another example, the vessel 351 of the mixing apparatus 395 may have a vertically cylindrical shape, and an environmental control component 356 of the mixing apparatus 395 may be a paddle that is vertical oriented and that rotates within the vessel 351 to mix the biomass slurry feedstock 327, the fluid 337, and any other components to form the biomass slurry 347.

In some cases, one or more valves (e.g., similar to the valves 385 discussed above) may be positioned at or adjacent to one or more of the inputs 352 and/or the one or more of the outputs 354 of the vessel 351 to control the flow of the biomass slurry feedstock 327, the fluid 337, and/or any other components into the vessel 351 and/or to control the flow of the biomass slurry 347 out of the vessel 351. In such a case, each valve may be controlled manually (e.g., by a user 359) and/or automatically by a controller 304. The mixing apparatus 395 (or portions thereof, such as the vessel 351) may have a single stage or multiple stages (e.g., mixing, heating, cooling, aerating the fluid 337 and the biomass slurry feedstock 327 at an initial stage and later adding an additive 357). In addition, or in the alternative, the mixing apparatus 395 may be located at a single facility and/or location, or distributed over multiple facilities and/or locations. A more detailed embodiment of a mixing apparatus is discussed below with respect to FIG. 7.

Once the biomass slurry 347 leaves the output 354 of the vessel 351 of the mixing apparatus 395, the biomass slurry 347 is delivered to the biomass slurry injection equipment 309 via part of the conveyance network 388. In certain example embodiments, before the biomass slurry 347 is delivered to the biomass slurry injection equipment 309, the biomass slurry 347 is evaluated to ensure that the biomass slurry 347 is suitable for subterranean injection. In such cases, a controller 304 of the biomass slurry preparation system 350 may be configured to compare the measurements, as taken by one or more of the sensor devices 360, of one or more parameters associated with the biomass slurry 347 to ensure that each of the values of the measurements fall within a range of acceptable values.

For example, a controller 304 may determine whether the biomass slurry 347 has a specific gravity of at least 1.03. As another example, a controller 304 may determine whether the biomass slurry 347 has a density of less than 2.50 g/cm$^3$. As yet another example, a controller 304 may determine whether the biomass slurry 347 has between approximately 5% and approximately 75% solids to liquids. As still another example, a controller 304 may determine whether the biomass slurry 347 has a viscosity of between approximately 15 cP and approximately 10,000 cP. If the controller 304 determines that the value of a measurement of a parameter associated with the biomass slurry 347 falls outside a range of acceptable values, the controller 304 may take appropriate action (e.g., change the operation of one or more of the environmental control components 356 of the mixing apparatus 395, modify (e.g., add, remove, adjust an amount of) an additive 357, change the operation of the biomass preparation apparatus 393, change the operation of the fluid preparation apparatus 394) to correct the issue.

The biomass slurry injection equipment 309 of the field system 399 of FIG. 3 is substantially the same as the biomass slurry injection equipment 109 and the biomass slurry injection equipment 209 discussed above with respect to FIGS. 1A through 2. Similarly, the one or more wellbores 311 of the field system 399 of FIG. 3 are substantially the same as the wellbores 111 and the wellbores 211 discussed above with respect to FIGS. 1A through 2.

In certain example embodiments, injection of the biomass slurry 347 into the subterranean formation 310 is a carbon sequestration process that may rely on a waste disposal method from the oil and gas industry. For example, waste biomass slurry feedstock 327 may be collected and transported to an injection facility (e.g., proximate to a wellbore 311) where the biomass slurry feedstock 327 is processed (e.g., using the biomass preparation apparatus 393) to a small particle size (e.g., less than 60,000 µm), mixed with a fluid 337 (e.g., water) to create a biomass slurry 347, and injected into an underground formation 310 using biomass slurry injection equipment 309. This injection technique is used by oil and gas well operators to dispose of drilling waste. The biomass slurry can be deposited in underground reservoirs (e.g., salt caverns) or stored in newly created fractures in suitable geologic layers of the subterranean formation 310.

With the injection of drilling waste, the lifetime of a waste disposal well is finite (e.g., typically five years), and well operators must obtain a Class I, Class II, or Class V underground injection permit from a governmental agency (e.g., a state agency, the EPA). By contrast, injecting a biomass slurry 347 as discussed herein using example embodiments generates "durable" carbon dioxide removals (CDRs) because the biogenic carbon in the Biomass and/or other part of the biomass slurry feedstock 327 in the biomass slurry 347 is removed from the terrestrial carbon cycle (biosphere) and permanently sequestered underground, preventing the release of $CO_2$ to the atmosphere. Example embodiments can combine multiple types of biomass slurry feedstock 327 for processing and injecting a biomass slurry 347. For example, example embodiments may use waste sources for both biomass slurry feedstock 327 and fluid 337 (e.g., wastewater) to avoid activity-shifting leakage.

Each power source 389 of the overall system 300 may provide power and/or control signals to one or more of the other components (e.g., the conveyance network 388, an environmental control component 356 of the mixing apparatus 395, the biomass preparation apparatus 393, the fluid preparation apparatus 394, the biomass slurry injection equipment 309) via power transfer links 387 and/or communication links 305 (discussed below). In some cases, a power source 389 obtains power from a power supply (e.g., AC mains, a generator) and manipulates (e.g., transforms, rectifies, inverts) that power to provide the manipulated power to one or more other components of the overall system 300 or portions thereof, where the manipulated power is of a type (e.g., alternating current, direct current) and level (e.g., 12V, 24V, 120V) that may be used by one or more of the other components of the overall system 300.

A power source 389 may include one or more of a number of single or multiple discrete components (e.g., transistor, diode, resistor, transformer) and/or a microprocessor. A power source 389 may include a printed circuit board, upon which the microprocessor and/or one or more discrete components are positioned. In addition, or in the alternative, a power source 389 may be a source of power in itself to provide power and/or control signals to the other components of the overall system 300. For example, a power source 389 may be or include one or more energy storage devices (e.g., batteries). As another example, a power source 389 may be or include a photovoltaic generation system.

In some cases, some or all of the mixing apparatus 395 may be operated based on measurements of one or more parameters associated with the biomass slurry feedstock 327, the fluid 337, and/or the additives 357 and made by one or more sensor devices 360. Each sensor device 360 of the overall system 300 includes one or more sensors that measure one or more parameters (e.g., pressure, flow rate, temperature, humidity, depth, location, content of fluid 337, size of the pieces of biomass slurry feedstock 327, characteristics of the biomass slurry 347, voltage, electrical current, etc.). Examples of a sensor of a sensor device 360 may include, but are not limited to, a temperature sensor, a flow sensor, a pressure sensor, a gas spectrometer, a voltmeter, an ammeter, a gyroscope, a spectrograph, a gas chromatograph, a viscometer, and a camera. A sensor device 360 may be a stand-alone device or integrated with another component of the overall system 300, including another component (e.g., an environmental control component 356) of the biomass slurry preparation system 350.

As discussed above, a parameter measured by a sensor device 360 may be associated with the biomass slurry 347, the biomass slurry feedstock 327, the fluid 337, and/or the additives 357. In some cases, in addition, a parameter measured by a sensor device 360 may be associated with one or more other components (e.g., a motor, a power source 389, a component of the mixing apparatus 395) of the biomass slurry preparation system 350. For example, a sensor device 360 may be configured to determine the degree to which a valve 385 within the conveyance network 388 is open or closed.

In some cases, a number of sensor devices 360, each measuring a different parameter, may be used in combination to determine and confirm whether a controller 304 should take a particular action (e.g., operate a valve 385, adjust the speed of a motor, operate or adjust the operation of an environmental control component 356 of the mixing apparatus 395). When a sensor device 360 includes its own controller (or portions thereof), similar to a controller 304, then the sensor device 360 may be considered a type of computer device, as discussed below with respect to FIG. 5.

A user 359 may be any person that interacts, directly or indirectly, with a controller 304 and/or any other component of the overall system 300, including any component of the example biomass slurry preparation system 350. Examples of a user 359 may include, but are not limited to, a business owner, an engineer, a company representative, a geologist, a consultant, a drilling engineer, a contractor, a regulatory authority, and a manufacturer's representative. A user 359 may use one or more user systems 355, which may include a display (e.g., a GUI). A user system 355 of a user 359 may interact with (e.g., send data to, obtain data from) a controller 304 via an application interface and using the communication links 305. The user 359 may also interact directly with a controller 304 through a user interface (e.g., keyboard, mouse, touchscreen). Examples of a user system 355 may include, but are not limited to, a cell phone, a smart phone, a desktop computer, a laptop computer, a tablet, and a handheld electronic device.

The network manager 380 is a device or component that controls all or a portion (e.g., a communication network, a controller 304) of the overall system 300 or portions thereof, including one or more components of the biomass slurry preparation system 350. The network manager 380 may be substantially similar to some or all of a controller 304, as described above. For example, the network manager 380 may include a controller that has one or more components and/or similar functionality to some or all of a controller 304. Alternatively, the network manager 380 may include one or more of a number of features in addition to, or altered from, the features of a controller 304. As described herein, control and/or communication with the network manager 380 may include communicating with one or more other components of the overall system 300 (including one or more components of the biomass slurry preparation system 350) and/or another system. In such a case, the network manager 380 may facilitate such control and/or communication. The network manager 380 may be called by other names, including but not limited to a master controller, a network controller, and an enterprise manager. The network manager 380 may be considered a type of computer device, as discussed below with respect to FIG. 5.

Interaction between each controller 304, the sensor devices 360, the users 359 (including any associated user systems 355), the network manager 380, and other components (e.g., the valves 385, the mixing apparatus 395) of the overall system 300, including other components of the biomass slurry preparation system 350, may be conducted using communication links 305 and/or power transfer links 387.

Each communication link 305 may include wired (e.g., Class 1 electrical cables, electrical connectors, Power Line Carrier, RS485) and/or wireless (e.g., Wi-Fi, Zigbee, visible light communication, cellular networking, Bluetooth, Bluetooth Low Energy (BLE), ultrawide band (UWB), WirelessHART, ISA100) technology. Each power transfer link 387 may include one or more electrical conductors, which may be individual or part of one or more electrical cables. In some cases, as with inductive power, power may be transferred wirelessly using power transfer links 387. A power transfer link 387 may transmit power from one component (e.g., a power source 389) of the overall system 300 to another (e.g., one or more components of the mixing apparatus 395). When in the form of electrical cables, each power transfer link 387 may be sized (e.g., 12 gauge, 18 gauge, 4 gauge) in a manner suitable for the amount (e.g., 480V, 24V, 120V) and type (e.g., alternating current, direct current) of power transferred therethrough.

A controller 304 of the overall system 300 is configured to communicate with and in some cases control one or more of the other components (e.g., a sensor device 360, the mixing apparatus 395, a valve 385, another controller 304) of the overall system 300, including other components of the biomass slurry preparation system 350. A controller 304 performs any of a number of functions that include, but are not limited to, obtaining and sending data, evaluating data, following protocols, running algorithms, and sending commands.

Figure 4:
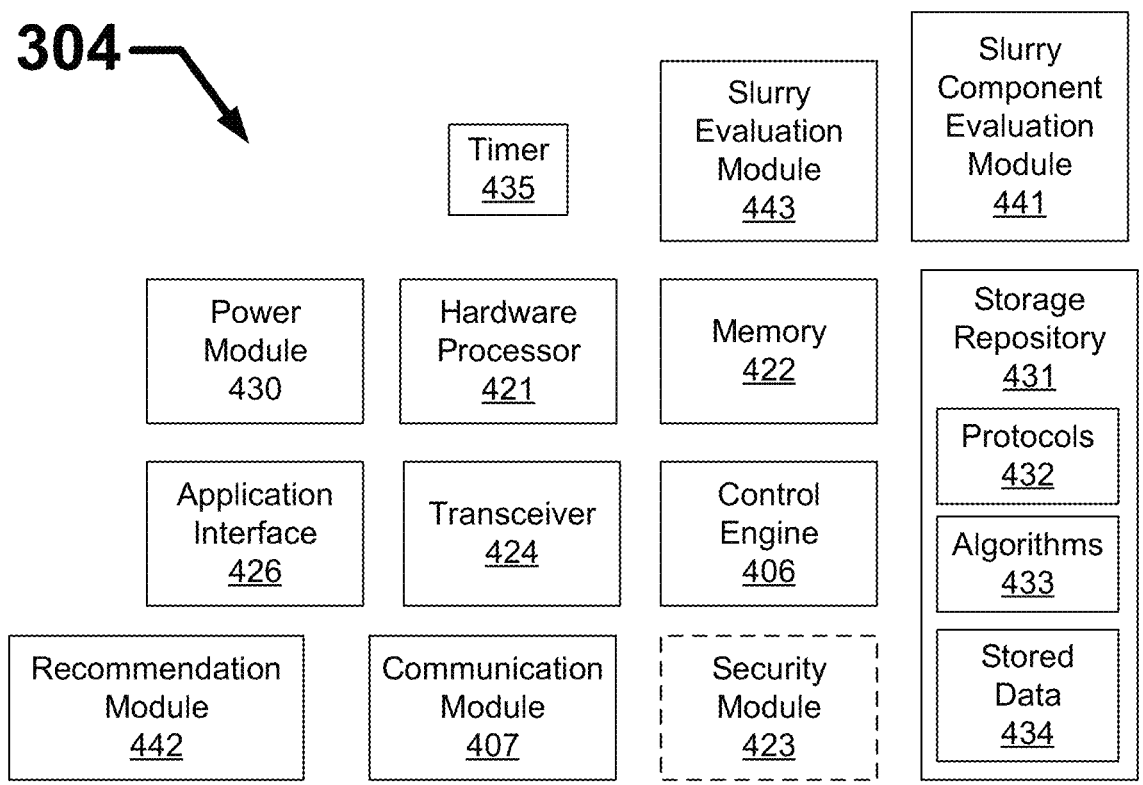
FIG. 4 shows a block diagram of a controller of the biomass slurry preparation system of FIG. 3 according to certain example embodiments.

A controller 304 may include one or more of a number of components. For example, as shown in FIG. 4, such components of a controller 304 may include, but are not limited to, a control engine, a communication module, a timer, a power module, a storage repository, a hardware processor, a memory, a transceiver, an application interface, and a security module. A controller 304 (or components thereof) may be located at or near the various components of the overall system 300, including the biomass slurry preparation system 350. In addition, or in the alternative, a controller 304 (or components thereof) may be located remotely from (e.g., in the cloud, at an office building) the various components of the overall system 300.

When there are multiple controllers 304 (e.g., one controller 304 for one or more of the power sources 389, another controller 304 for a motor of the conveyance network 388, yet another controller 304 for the mixing apparatus 395), each controller 304 may operate independently of each other. Alternatively, two or more of the multiple controllers 304 may work cooperatively with each other. As yet another alternative, one of the controllers 304 may control some or all of one or more other controllers 304 in the overall system 300 or portion thereof (e.g., the biomass slurry preparation system 350). Each controller 304 may be considered a type of computer device, as discussed below with respect to FIG. 5.

As discussed above, one or more of the controllers 304 of the overall system 300 may be part of and/or control part of the example biomass slurry preparation system 350. FIG. 4 shows a block diagram of a controller 304 of the biomass slurry preparation system 350 of the overall system 300 of FIG. 3 according to certain example embodiments. Referring to the description above with respect to FIGS. 1A through 3, the controller 304 of FIG. 4 includes multiple components or modules. For example, as shown in FIG. 4, the components of such a controller 304 of the biomass slurry preparation system 350 may include, but are not limited to, a control engine 406, a slurry component evaluation module 441, a slurry evaluation module 443, a recommendation module 442, a communication module 407, a timer 435, a power module 430, a storage repository 431, a hardware processor 421, memory 422, a transceiver 424, an application interface 426, and, optionally, a security module 423.

In such a case, a controller 304 of the example biomass slurry preparation system 350 may be configured to perform analysis (e.g., chemistry analysis, temperature analysis, flow rate analysis) on the biomass slurry feedstock 327, the fluid 337, the additives 357, the slurry 347, and/or one or more other components of the biomass slurry preparation system 350. In this way, a controller 304 may be used, for example, to monitor the performance and/or status of the example biomass slurry preparation system 350 (including portions thereof, such as an environmental control component 356 of the mixing apparatus 395) in real time.

The various components of the controller 304 may be centrally located. In addition, or in the alternative, some of the components of the controller 304 may be located remotely from (e.g., in the cloud, at an office building) one or more of the other components of the controller 304. The components shown in FIG. 4 are not exhaustive, and in some embodiments, one or more of the components shown in FIG. 4 may not be included in the example controller 304 of the biomass slurry preparation system 350. Any component of the controller 304 may be discrete or combined with one or more other components of the controller 304. Also, one or more components of the controller 304 may have different configurations. For example, the controller 304, rather than being a stand-alone device, may be part of one or more other components of the biomass slurry preparation system 350. For instance, part of the controller 304 may be integrated with a sensor device 360, the mixing apparatus 395, part of the conveyance network 388, and/or some other component of the biomass slurry preparation system 350.

The storage repository 431 of the controller 304 may be a persistent storage device (or set of devices) that stores software and data used to assist the controller 304 in communicating with one or more other components of the overall system 300 (including other components of the example biomass slurry preparation system 350), such as the users 359 (including associated user systems 355), the network manager 380, the other controllers 304, the sensor devices 360, the power sources 389, the mixing apparatus 395, the valves 385, and/or any other components of the overall system 300, including other components of the biomass slurry preparation system 350. In one or more example embodiments, the storage repository 431 stores one or more protocols 432, one or more algorithms 433, and stored data 434.

The protocols 432 of the storage repository 431 may be any procedures (e.g., a series of method steps) and/or other similar operational processes that the control engine 406 of the controller 304 follows based on certain conditions at a point in time. The protocols 432 may include any of a number of communication protocols that are used to send and/or obtain data between the controller 304 and other components of the overall system 300, including other components of the biomass slurry preparation system 350. Such protocols 432 used for communication may be a time-synchronized protocol. Examples of such time-synchronized protocols may include, but are not limited to, a highway addressable remote transducer (HART) protocol, a wirelessHART protocol, and an International Society of Automation (ISA) 100 protocol. In this way, one or more of the protocols 432 may provide a layer of security to the data transferred within the overall system 300. Other protocols 432 used for communication may be associated with the use of Wi-Fi, Zigbee, visible light communication (VLC), cellular networking, BLE, UWB, and Bluetooth.

The algorithms 433 may be or include any formulas, mathematical models, forecasts, simulations, and/or other similar tools that a component (e.g., the control engine 406, the slurry component evaluation module 441, the slurry evaluation module 443) of the controller 304 uses to reach a computational conclusion. For example, one or more algorithms 433 may be used, in conjunction with one or more protocols 432, to assist the controller 304 to obtain values associated with measurements of a parameter, made by one or more of the sensor devices 360, associated with the biomass slurry feedstock 327, the fluid 337, the additives 357, the slurry 347, and/or the operation of a component (e.g., the mixing apparatus 395, a biomass preparation apparatus 393, a fluid preparation apparatus 394, part of the conveyance network 388) of the biomass slurry preparation system 350.

As another example, one or more algorithms 433 may be used, in conjunction with one or more protocols 432, to assist the controller 304 (and more specifically the slurry component evaluation module 441) to use the values associated with the measurements made by the sensor devices 360 to evaluate some or all of the biomass slurry feedstock 327, some or all of the fluid 337, and/or one or more of the additives 357 at a point in time and/or over time. As another example, one or more algorithms 433 may be used, in conjunction with one or more protocols 432, to assist the controller 304 (and more specifically the slurry evaluation module 443) to use the values associated with the measurements made by the sensor devices 360 to evaluate the slurry 347 (e.g., the formulation of the slurry 347, one or more of the properties (e.g., salt content, viscosity, density, size or range of sizes of the biomass slurry feedstock 327) of the biomass slurry 347) at a point in time and/or over time.

In some cases, one or more algorithms 433 may be used, in conjunction with one or more protocols 432, to assist the controller 304 (and more specifically the slurry evaluation module 443) to identify (and in some cases implement (e.g., control the conveyance network 388, control the fluid preparation apparatus 394, control the additive preparation apparatus 392, control the biomass preparation apparatus 393)) specific steps (e.g., add/remove/alter an amount of an additive 357, introduce an additive 357 into the fluid preparation apparatus 394 rather than the mixing apparatus 395) that may be taken to improve or optimize one or more of the properties of the slurry 347 that is created within and output by the mixing apparatus 395.

As yet another example, one or more algorithms 433 may be used, in conjunction with one or more protocols 432, to assist the controller 304 to compare the result of an algorithm 433 with a range of acceptable values (e.g., stored data 434), where the range of acceptable values is established using prior results (e.g., stored data 434) of the algorithm 433. As still another example, one or more algorithms 433 may be used, in conjunction with one or more protocols 432, to assist the controller 304 to modify or establish a new algorithm 433 and/or protocol 432 based on differences between expected values and actual values. As yet another example, one or more algorithms 433 may be used, in conjunction with one or more protocols 432, to assist the controller 304 to use the values associated with the measurements made by the sensor devices 360 to control the operation of one or more portions (e.g., the mixing apparatus 395, a biomass preparation apparatus 393, a fluid preparation apparatus 394, part of the conveyance network 388) of the biomass slurry preparation system 350.

As yet another example, one or more algorithms 433 may be used, in conjunction with one or more protocols 432, to assist the controller 304 to use the values associated with the measurements made by the sensor devices 360 to evaluate some (e.g., an environmental control component 356 of the mixing apparatus 395) or all of the biomass slurry preparation system 350. As still another example, one or more algorithms 433 may be used, in conjunction with one or more protocols 432, to assist the controller 304 (and more specifically the recommendation module 442) to make specific recommendations as to what portions of the biomass slurry preparation system 350 and/or other parts (e.g., an additive preparation apparatus 392) of the overall system 300 needs adjustment, maintenance, repair, and/or replacement.

An algorithm 433 may be or be based on machine learning and/or an analytical model. For example, the control engine 406 of the controller 304, through the use of one or more protocols 432 and/or one or more algorithms 433, may implement machine learning as a way to evolve over time with new data and associated changes that may result from the new data. The control engine 406 may use, for example, supervised learning, unsupervised learning, semi-supervised learning, and/or reinforcement learning, as those terms are known in the art of machine learning. In this case, these types of machine learning are effective with sufficient data (e.g., measurements from sensor devices 360) and use of algorithms 433 and/or protocols 432 that automatically build mathematical models using sample data—also known as "training data".

In this way, for example, the controller 304 may measure and interpret the measurements of one or more parameters associated with the biomass slurry feedstock 327, the fluid 337, the additives 357, the slurry 347, and/or the operation of a component (e.g., the mixing apparatus 395, a biomass preparation apparatus 393, a fluid preparation apparatus 394, part of the conveyance network 388) of the biomass slurry preparation system 350 in order to establish baselines, compare subsequent data to baselines, adjust baselines, perform retroactive analysis, assess the slurry 347, assess some or all of the biomass slurry feedstock 327, assess some or all of the fluid 337, assess some or all of the additives 357, recommend a different composition of the slurry 347, recommend a replacement to an existing component of the biomass slurry preparation system 350, etc., using data and language elements native to the controller 304. Using this flexibility allowed by the learning protocols 432 and/or algorithms 433, the controller 304 may scale to disparate vendor solutions and 'build' asset development optimization scenarios and recommendations. The learning protocols 432 and/or algorithms 433 may use or include large language models (LLM) to implement unique classification/semantic matching properties that may assist in the development of asset optimization by the controller 304.

The learning protocols 432 and/or algorithms 433 that may be used and trained by the control engine 406 may include, but are not limited to, instance-based learning algorithms, artificial neural network algorithms, deep learning algorithms, and ensemble algorithms. Instance-based learning algorithms typically build up a database of example data and compare new data to the database using a similarity measure in order to find the best match and make a prediction. For this reason, instance-based methods are also called winner-take-all methods and memory-based learning. Focus may be put on the representation of the stored instances and similarity measures used between instances. Instance-based algorithms may be computationally expensive for very large datasets since they save all training instances/data points and are sensitive to data noise.

Artificial neural networks may be fairly similar to the human brain. For example, artificial neural networks may be made up of artificial neurons, take in multiple inputs, and produce specific outputs. Artificial neural networks may be an enormous subfield comprised of a large number of neural network architectures and hundreds of algorithms and variations for different types of problems. Artificial neural networks may be biologically inspired computational simulations for certain specific tasks like clustering, classification, or pattern recognition.

Deep learning algorithms may be a modern update to artificial neural networks by building much larger and more complex neural networks. With deep learning, many methods may be applied to very large datasets. Various architectures may be applied for deep learning algorithms. Deep learning may have a high computational cost because much of its development requires advanced processing, storage hardware, and ML platforms/APIs.

Ensemble algorithm methods may be models composed of multiple weaker models that are independently trained and whose predictions are combined in some way to make the overall prediction. Various combination techniques (e.g., averaging, max voting, bagging/bootstrapping (sampling subsets of original complete dataset), boosting) may be applied. Unlike other standard ensemble methods where models are trained in isolation, the boosting technique may employ an iterative approach, training models in succession, with each new model being trained to correct the errors made by the previous ones. Models may be added sequentially until no further improvements may be made.

Stored data 434 may be any data associated with the various equipment (e.g., the mixing apparatus 395, a power source 389, a sensor device 360), including associated components, of the biomass slurry preparation system 350, the user systems 355, the network manager 380, the other controllers 304, the sensor devices 360 outside the biomass slurry preparation system 350, measurements made by the sensor devices 360, specifications of the sensor devices 360, the composition of the biomass slurry feedstock 327, the composition of the fluid 337, the composition of the additives 357, the composition of the slurry 347, the temperature ranges of the slurry 347, viscosity of the slurry 347, threshold values, ranges of acceptable values, tables, results of previously run or calculated algorithms 433, updates to protocols 432 and/or algorithms 433, user preferences, and/or any other suitable data. Such data may be any type of data, including but not limited to historical data, present data, and future data (e.g., forecasts). The stored data 434 may be associated with some measurement of time derived, for example, from the timer 435.

Examples of a storage repository 431 may include, but are not limited to, a database (or a number of databases), a file system, cloud-based storage, a hard drive, flash memory, some other form of solid-state data storage, or any suitable combination thereof. The storage repository 431 may be located on multiple physical machines, each storing all or a portion of the protocols 432, the algorithms 433, and/or the stored data 434 according to some example embodiments. Each storage unit or device may be physically located in the same or in a different geographic location.

The storage repository 431 may be operatively connected to the control engine 406. In one or more example embodiments, the control engine 406 includes functionality to communicate with the users 359 (including associated user systems 355), the other controllers 304, the sensor devices 360, the network manager 380, and any other components in the overall system 300 (including other components of the biomass slurry preparation system 350). More specifically, the control engine 406 sends information to and/or obtains information from the storage repository 431 in order to communicate with the users 359 (including associated user systems 355), the other controllers 304, the sensor devices 360, the network manager 380, and any other components of the overall system 300 (including other components of the biomass slurry preparation system 350). As discussed below, the storage repository 431 may also be operatively connected to the communication module 407 in certain example embodiments.

In certain example embodiments, the control engine 406 of the controller 304 controls the operation of one or more components (e.g., the communication module 407, the timer 435, the transceiver 424) of the controller 304. For example, the control engine 406 may activate the communication module 407 when the communication module 407 is in "sleep" mode and when the communication module 407 is needed to send data obtained from another component (e.g., a sensor device 360, another controller 304) in the overall system 300, including other components of the biomass slurry preparation system 350. In addition, the control engine 406 of the controller 304 may control the operation of one or more other components (e.g., a sensor device 360, another controller 304), or portions thereof, of the overall system 300 (including components of the biomass slurry preparation system 350).

The control engine 406 of the controller 304 may communicate with one or more other components of the overall system 300 (including other components of the biomass slurry preparation system 350). For example, the control engine 406 may use one or more protocols 432 to facilitate communication with the sensor devices 360 of the overall system 300 (including the example biomass slurry preparation system 350) to obtain data, e.g., measurements of various parameters (e.g., temperature, viscosity, chemical composition, pH, pressure, proximity, and flow rate), whether in real time or on a periodic basis, and/or to instruct a sensor device 360 to take a measurement. The control engine 406 may use measurements (including the associated values) of parameters taken by the sensor devices 360 to perform one or more steps in preparing the slurry 347 and/or in evaluating the example biomass slurry preparation system 350 using one or more protocols 432 and/or one or more algorithms 433.

For instance, the control engine 406 may use one or more algorithms 433 and/or one or more protocols 432 to obtain values associated with measurements of one or more parameters associated with a biomass slurry preparation system 350, including but not limited to the biomass slurry feedstock 327, the fluid 337, the additives 357, the slurry 347. If the sensor device 360 that made the measurement is not capable of generating an associated value for the measurement, then the control engine 406, using one or more algorithms 433, one or more protocols 432 and/or stored data 434, may generate values based on the measurements. In some cases, the control engine 406, using one or more algorithms 433, one or more protocols 432 and/or stored data 434, may validate and/or format the measurements made by a sensor device 360 and received by the control engine 406 before the measurements are used by the controller 304 and/or communicated to another component (e.g., a user system 355, the network manager 380) in the overall system 300, including other components of components of the biomass slurry preparation system 350.

As still another example, the control engine 406 may use one or more algorithms 433 and/or one or more protocols 432 to use the values associated with the measurements to generate a result (e.g., a numeric value, a range of probabilities). As yet another example, the control engine 406 may use one or more algorithms 433 and/or one or more protocols 432 to compare the result of an algorithm 433 with a range of acceptable values (e.g., stored data 434), where the range of acceptable values is established using prior results (e.g., stored data 434) of the algorithm 433. As still another example, the control engine 406, in support of the slurry component evaluation module 441, may use one or more algorithms 433 and/or protocols 432 to evaluate some or all of the biomass slurry feedstock 327, some or all of the fluid 337, and/or one or more of the additives 357 at a point in time and/or over time. As yet another example, the control engine 406, in support of the slurry component evaluation module 441, may use one or more algorithms 433 and/or protocols 432 to determine that a component of the biomass slurry preparation system 350 has a potential failure (e.g., as when the result of an algorithm 433 falls outside the range of acceptable values).

As yet another example, the control engine 406 of a controller 304, in support of the biomass slurry evaluation module 443, may use one or more algorithms 433, in conjunction with one or more protocols 432, to determine whether the volume, viscosity, pH, chemical composition, and/or other characteristics of the slurry 347 is within a range of acceptable values. As yet another example, the control engine 406 of a controller 304, in support of the recommendation module 442, may use one or more algorithms 433 and/or one or more protocols 432 to make specific recommendations as to what portions of the biomass slurry preparation system 350 should be operationally adjusted, receive maintenance, and/or receive repair over time or at a point in time.

As still another example, the control engine 406, using one or more algorithms 433, one or more protocols 432, and stored data 434, may modify or establish a new algorithm 433 and/or protocols 432 based on differences between expected values and actual values. As yet another example, the control engine 406, using one or more algorithms 433, one or more protocols 432, and stored data 434, may use the values associated with the measurements made by the sensor devices 360 to control the operation of one or more portions (e.g., the mixing apparatus 395, a biomass preparation apparatus 393, a fluid preparation apparatus 394, part of the conveyance network 388) of the biomass slurry preparation system 350.

The control engine 406 may generate and process data associated with control, communication, and/or other signals sent to and obtained from the users 359 (including associated user systems 355), the other controllers 304, the sensor devices 360, the network manager 380, and any other components of the overall system 300, including other components of the biomass slurry preparation system 350. In certain embodiments, the control engine 406 of the controller 304 may communicate with one or more components of a system external to the overall system 300. For example, the control engine 406 may interact with an inventory management system by ordering, in real time, replacements for components or pieces of equipment (e.g., a sensor device 360, a valve 385, a motor) within the overall system 300 that has failed or is failing. As another example, the control engine 406 may interact with a contractor or workforce scheduling system, in real time, by arranging for the labor needed to replace a component or piece of equipment in the system. In this way and in other ways as discussed herein, the controller 304 is capable of performing a number of functions beyond what could reasonably be considered a routine task.

In certain example embodiments, the control engine 406 may include an interface that enables the control engine 406 to communicate with the other controllers 304, the sensor devices 360, the user systems 355, the network manager 380, and any other components of the overall system 300, including other components of components of the biomass slurry preparation system 350. For example, if a user system 355 operates under IEC Standard 62386, then the user system 355 may have a serial communication interface that will transfer data to the controller 304. Such an interface may operate in conjunction with, or independently of, the protocols 432 used to communicate between the controller 304 and the users 359 (including corresponding user systems 355), the other controllers 304, the sensor devices 360, the network manager 380, and any other components of the overall system 300, including other components of the biomass slurry preparation system 350.

The control engine 406 (or other components of the controller 304) may also include one or more hardware components and/or software elements to perform its functions. Such components may include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The slurry component evaluation module 441 of the controller 304 of the example biomass slurry preparation system 350 may be configured to evaluate, in real time, the various components (e.g., each part of the biomass slurry feedstock 327, the characteristics (e.g., ratio among various biomass sources 328, range of sizes of the pieces) of the collective biomass slurry feedstock 327, each part of the fluid 337, the characteristics (e.g., ratio among various fluid sources 338, pH value, viscosity) of the collective fluid 337, each of the additives 357, the characteristics (e.g., ratio among various additive sources 358, chemical composition) of the collective additives 357) of the components that make up the biomass slurry 347 once combined within the mixing apparatus 395.

In certain example embodiments, the slurry component evaluation module 441 is configured to evaluate some or all of the various biomass slurry feedstock 327, one or more of the various fluids 337, and/or one or more of the various optional additives 357 on a continuous basis, periodically, randomly, or some other measure of time. Further, in some cases, the slurry component evaluation module 441 may be configured to evaluate one or more of the various biomass slurry feedstock 327, one or more of the various fluids 337, and/or one or more of the various optional additives 357 simultaneously.

In some cases, the slurry component evaluation module 441 may also be configured to evaluate one or more of the biomass sources 328, the biomass preparation apparatus 393, one or more of the fluid sources 338, the fluid preparation apparatus 394, one or more of the additive sources 358, and/or the additive preparation apparatus 392. In some cases, the slurry component evaluation module 441 may also be configured to evaluate a portion (e.g., up to and including the mixing apparatus 395) or all of the conveyance network 388 and/or a portion (e.g., the inputs 352, some or all of the environmental control components 356) of the mixing apparatus 395. The slurry component evaluation module 441 may operate using one or more algorithms 433, one or more protocols 432, and/or stored data 434 (e.g., measurements made by one or more sensor devices 360).

The slurry evaluation module 443 of the controller 304 of the example biomass slurry preparation system 350 may be configured to evaluate, in real time, the composition, viscosity, pH, and/or other characteristics of the biomass slurry 347. The slurry evaluation module 443 may use values associated with measurements of one or more parameters made by one or more sensor devices 360 to evaluate the biomass slurry 347. Examples of such parameters may include, but are not limited to, flow rate, pressure, chemical composition, viscosity, pH value, and temperature. The slurry evaluation module 443 may use one or more protocols 432 and/or one or more algorithms 433 to perform any of its evaluations.

In certain example embodiments, the slurry evaluation module 443 is configured to evaluate some or all of the biomass slurry 347 on a continuous basis, periodically, randomly, or some other measure of time. In some cases, the slurry evaluation module 443 may also be configured to evaluate a portion (e.g., between the mixing apparatus 395 and the biomass slurry injection equipment 309) or all of the conveyance network 388 and/or a portion (e.g., the outputs 354, some or all of the environmental control components 356) of the mixing apparatus 395. The slurry evaluation module 443 may operate using one or more algorithms 433, one or more protocols 432, and/or stored data 434 (e.g., measurements made by one or more sensor devices 360).

For example, the slurry evaluation module 443, using one or more algorithms 433, one or more protocols 432, and stored data 434 (e.g., values associated with the measurements made by the sensor devices 360) may evaluate the slurry 347 (e.g., the formulation of the slurry 347, one or more of the properties (e.g., salt content, viscosity, density, size or range of sizes of the biomass slurry feedstock 327) of the biomass slurry 347) at a point in time and/or over time. In some cases, the slurry evaluation module 443, using one or more algorithms 433, one or more protocols 432, and stored data 434, may identify (and in some cases implement (e.g., control the conveyance network 388, control the fluid preparation apparatus 394, control the additive preparation apparatus 392, control the biomass preparation apparatus 393)) specific steps (e.g., add/remove/alter an amount of an additive 357, introduce an additive 357 into the fluid preparation apparatus 394 rather than the mixing apparatus 395) that may be taken to improve or optimize one or more of the properties of the biomass slurry 347 that is created within and output by the mixing apparatus 395.

The recommendation module 442 of the controller 304 of the example biomass slurry preparation system 350 may be configured to recommend actions to be taken (e.g., change the position of a valve 385, change the chemical composition of the fluid 337, change (e.g., increase, reduce) the size of the pieces of the biomass slurry feedstock 327, perform maintenance on a component of the biomass slurry preparation system 350 ahead of schedule, adjust a setting on an environmental control component 356 of the mixing apparatus 395, add an additive 357 to the mixing apparatus 395) based on the slurry evaluation module 443 evaluating the slurry 347, the slurry component evaluation module 441 evaluating some or all of the biomass slurry feedstock 327, the fluid 337, and the additives 357, and/or evaluating the environmental control components 356 of the biomass slurry preparation system 350.

The recommendation module 442 may use one or more protocols 432, one or more algorithms 433, and/or stored data 434 (e.g., measurements made by one or more of the sensor devices 360) to perform any of its functions. In some cases, the recommendation module 442 may provide recommendations to a user 359 (including an associated user system 355), another controller 304, the network manager 380, and/or some other entity. The recommendation module 442 may provide recommendations automatically (e.g., based on the passage of time (e.g., every 6 hours), based on the occurrence of some event (e.g., when the measurement of a parameter falls outside a range of acceptable values), upon request from a user 359, and/or on some other basis. The recommendation module 442 may operate continuously or periodically.

The communication module 407 of the controller 304 determines and implements the communication protocol (e.g., from the protocols 432 of the storage repository 431) that is used when the control engine 406 communicates with (e.g., sends signals to, obtains signals from) the user systems 355, the other controllers 304, the sensor devices 360, the network manager 380, and any other components of the overall system 300, including other components of the biomass slurry preparation system 350. In some cases, the communication module 407 accesses the stored data 434 to determine which communication protocol is used to communicate with another component of the overall system 300, including other components of the biomass slurry preparation system 350. In addition, the communication module 407 may identify and/or interpret the communication protocol of a communication obtained by the controller 304 so that the control engine 406 may interpret the communication. The communication module 407 may also provide one or more of a number of other services with respect to data sent from and obtained by the controller 304. Such services may include, but are not limited to, data packet routing information and procedures to follow in the event of data interruption.

The timer 435 of the controller 304 may track clock time, intervals of time, an amount of time, and/or any other measure of time. The timer 435 may also count the number of occurrences of an event, whether with or without respect to time. Alternatively, the control engine 406 may perform a counting function. The timer 435 is able to track multiple time measurements and/or count multiple occurrences concurrently. The timer 435 may track time periods based on an instruction obtained from the control engine 406, based on an instruction obtained from a user 359, based on an instruction programmed in the software for the controller 304, based on some other condition (e.g., the occurrence of an event) or from some other component, or from any combination thereof. In certain example embodiments, the timer 435 may provide a time stamp for each packet of data obtained from another component (e.g., a sensor device 360) of the example biomass slurry preparation system 350.

The power module 430 of the controller 304 may be configured to obtain power from a power source 389 and manipulate (e.g., transforms, rectifies, inverts) that power to provide the manipulated power to one or more other components (e.g., the timer 435, the control engine 406) of the controller 304, where the manipulated power is of a type (e.g., alternating current, direct current) and level (e.g., 12V, 24V, 120V) that may be used by the other components of the controller 304. In some cases, the power module 430 may also provide power to one or more of the sensor devices 360 of the example biomass slurry preparation system 350.

The power module 430 may include one or more of a number of single or multiple discrete components (e.g., transistor, diode, resistor, transformer) and/or a microprocessor. The power module 430 may include a printed circuit board, upon which the microprocessor and/or one or more discrete components are positioned. In addition, or in the alternative, the power module 430 may be a source of power in itself to provide power and/or signals to the other components of the controller 304. For example, the power module 430 may be or include an energy storage device (e.g., a battery). As another example, the power module 430 may be or include a localized photovoltaic power generation system.

The hardware processor 421 of the controller 304 executes software, algorithms (e.g., algorithms 433), and firmware in accordance with one or more example embodiments. Specifically, the hardware processor 421 may execute software on the control engine 406 or any other portion of the controller 304, as well as software used by the users 359 (including associated user systems 355), the other controllers 304, the network manager 380, and/or other components of the overall system 300, including other components of components of the biomass slurry preparation system 350. The hardware processor 421 may be an integrated circuit, a central processing unit, a multi-core processing chip, SoC, a multi-chip module including multiple multi-core processing chips, or other hardware processor in one or more example embodiments. The hardware processor 421 may be known by other names, including but not limited to a computer processor, a microprocessor, and a multi-core processor.

In one or more example embodiments, the hardware processor 421 executes software instructions stored in memory 422. The memory 422 includes one or more cache memories, main memory, and/or any other suitable type of memory. The memory 422 may include volatile and/or non-volatile memory. The memory 422 may be discretely located within the controller 304 relative to the hardware processor 421. In certain configurations, the memory 422 may be integrated with the hardware processor 421.

In certain example embodiments, the controller 304 does not include a hardware processor 421. In such a case, the controller 304 may include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 304 (or portions thereof) to be programmable and function according to certain logic rules and thresholds without the use of a hardware processor. Alternatively, FPGAs, IGBTs, ICs, and/or similar devices may be used in conjunction with one or more hardware processors 421.

The transceiver 424 of the controller 304 may send and/or obtain control and/or communication signals. Specifically, the transceiver 424 may be used to transfer data between the controller 304 and the users 359 (including associated user systems 355), the other controllers 304, the sensor devices 360, the network manager 380, and any other components of the overall system 300, including other components of components of the biomass slurry preparation system 350. The transceiver 424 may use wired and/or wireless technology. The transceiver 424 may be configured in such a way that the control and/or communication signals sent and/or obtained by the transceiver 424 may be obtained and/or sent by another transceiver that is part of a user system 355, another controller 304, a sensor device 360, the network manager 380, and/or another component of the overall system 300, including another of components of the biomass slurry preparation system 350. The transceiver 424 may send and/or obtain any of a number of signal types, including but not limited to radio frequency signals, infrared signals, ultrasonic signals, radar signals, visible light communication (VLC) signals, and SONAR signals.

When the transceiver 424 uses wireless technology, any type of wireless technology may be used by the transceiver 424 in sending and obtaining signals. Such wireless technology may include, but is not limited to, Wi-Fi, Zigbee, VLC, cellular networking, BLE, UWB, and Bluetooth. The transceiver 424 may use one or more of any number of suitable communication protocols (e.g., ISA100, HART) when sending and/or obtaining signals.

Optionally, in one or more example embodiments, the security module 423 secures interactions between the controller 304, the users 359 (including associated user systems 355), the other controllers 304, the sensor devices 360, the network manager 380, and any other components of the overall system 300, including other components of the biomass slurry preparation system 350. More specifically, the security module 423 authenticates communication from software based on security keys verifying the identity of the source of the communication. For example, user software may be associated with a security key enabling the software of a user system 355 to interact with the controller 304. Further, the security module 423 may restrict receipt of information, requests for information, and/or access to information.

A user 359 (including an associated user system 355), the other controllers 304, the sensor devices 360, the network manager 380, and the other components of the overall system 300, including other components of the biomass slurry preparation system 350, may interact with the controller 304 using the application interface 426. Specifically, the application interface 426 of the controller 304 obtains data (e.g., information, communications, instructions, updates to firmware) from and sends data (e.g., information, communications, instructions) to the user systems 355 of the users 359, the other controllers 304, the sensor devices 360, the network manager 380, and/or the other components of the overall system 300, including other components of the biomass slurry preparation system 350.

Examples of an application interface 426 may be or include, but are not limited to, an application programming interface, a web service, a data protocol adapter, some other hardware and/or software, or any suitable combination thereof. Similarly, the user systems 355 of the users 359, the other controllers 304, the sensor devices 360, the network manager 380, and/or the other components of the overall system 300, including other components of the biomass slurry preparation system 350, may include an interface (similar to the application interface 426 of the controller 304) to obtain data from and send data to the controller 304 in certain example embodiments.

In addition, as discussed above with respect to a user system 355 of a user 359, one or more of the controllers 304, one or more of the sensor devices 360, the network manager 380, and/or one or more of the other components of the overall system 300, including other components of the biomass slurry preparation system 350, may include a user interface. Examples of such a user interface may include, but are not limited to, a graphical user interface, a touchscreen, a keyboard, a monitor, a mouse, some other hardware, or any suitable combination thereof.

The controllers 304, the users 359 (including associated user systems 355), the sensor devices 360, the network manager 380, and the other components of the overall system 300, including other components of the biomass slurry preparation system 350, may use their own system or share a system in certain example embodiments. Such a system may be, or contain a form of, an Internet-based or an intranet-based computer system that is capable of communicating with various software. A computer system includes any type of computing device and/or communication device, including but not limited to the controller 304. Examples of such a system may include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system may correspond to a computer system as described below with regard to FIG. 5.

Further, as discussed above, such a system may have corresponding software (e.g., user system software, sensor device software, controller software). The software may execute on the same or a separate device (e.g., a server, mainframe, desktop personal computer (PC), laptop, PDA, television, cable box, satellite box, kiosk, telephone, mobile phone, or other computing devices) and may be coupled by the communication network (e.g., Internet, Intranet, Extranet, LAN, WAN, or other network communication methods) and/or communication channels, with wire and/or wireless segments according to some example embodiments. The software of one system may be a part of, or operate separately but in conjunction with, the software of another system within and/or outside of the overall system 300.

Figure 5:
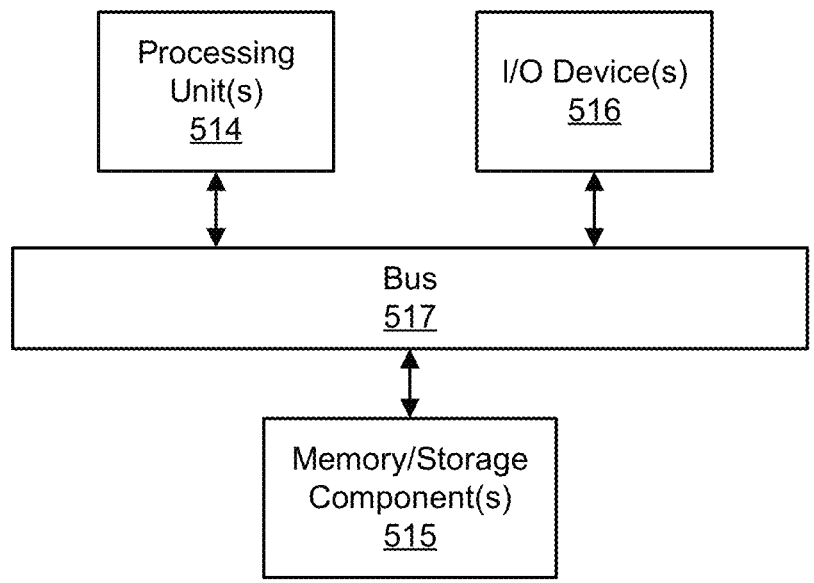
FIG. 5 shows a block diagram of a computing device according to certain example embodiments.

FIG. 5 shows a block diagram of a computing device 518 according to certain example embodiments. Specifically, FIG. 5 illustrates one embodiment of a computing device 518 that implements one or more of the various techniques described herein, and which is representative, in whole or in part, of the elements described herein pursuant to certain example embodiments. For example, a controller 304 (including components thereof, such as a control engine 406, a hardware processor 421, a storage repository 431, a power module 430, and a transceiver 424) may be considered a computing device 518. Computing device 518 is one example of a computing device and is not intended to suggest any limitation as to scope of use or functionality of the computing device and/or its possible architectures. Neither should the computing device 518 be interpreted as having any dependency or requirement relating to any one or combination of components illustrated in the example computing device 518.

The computing device 518 includes one or more processors or processing units 514, one or more memory/storage components 515, one or more input/output (I/O) devices 516, and a bus 517 that allows the various components and devices to communicate with one another. The bus 517 represents one or more of any of several types of bus structures, including a memory bus or memory controller, a peripheral bus, an accelerated graphics port, and a processor or local bus using any of a variety of bus architectures. The bus 517 includes wired and/or wireless buses.

The memory/storage component 515 represents one or more computer storage media. The memory/storage component 515 includes volatile media (such as random access memory (RAM)) and/or nonvolatile media (such as read only memory (ROM), flash memory, optical disks, magnetic disks, and so forth). The memory/storage component 515 includes fixed media (e.g., RAM, ROM, a fixed hard drive, etc.) as well as removable media (e.g., a Flash memory drive, a removable hard drive, an optical disk, and so forth).

One or more I/O devices 516 allow a user 359 to enter commands and information to the computing device 518, and also allow information to be presented to the user 359 and/or other components or devices. Examples of input devices 516 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques is stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 518 (also sometimes called a computer system herein) is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer device 518 includes at least the minimal processing, input, and/or output means necessary to practice one or more embodiments.

Further, those skilled in the art will appreciate that one or more elements of the aforementioned computer device 518 is located at a remote location and connected to the other elements over a network in certain example embodiments. Further, one or more embodiments are implemented on a distributed system having one or more nodes, where each portion of the implementation (e.g., the biomass slurry preparation system 350) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 6:
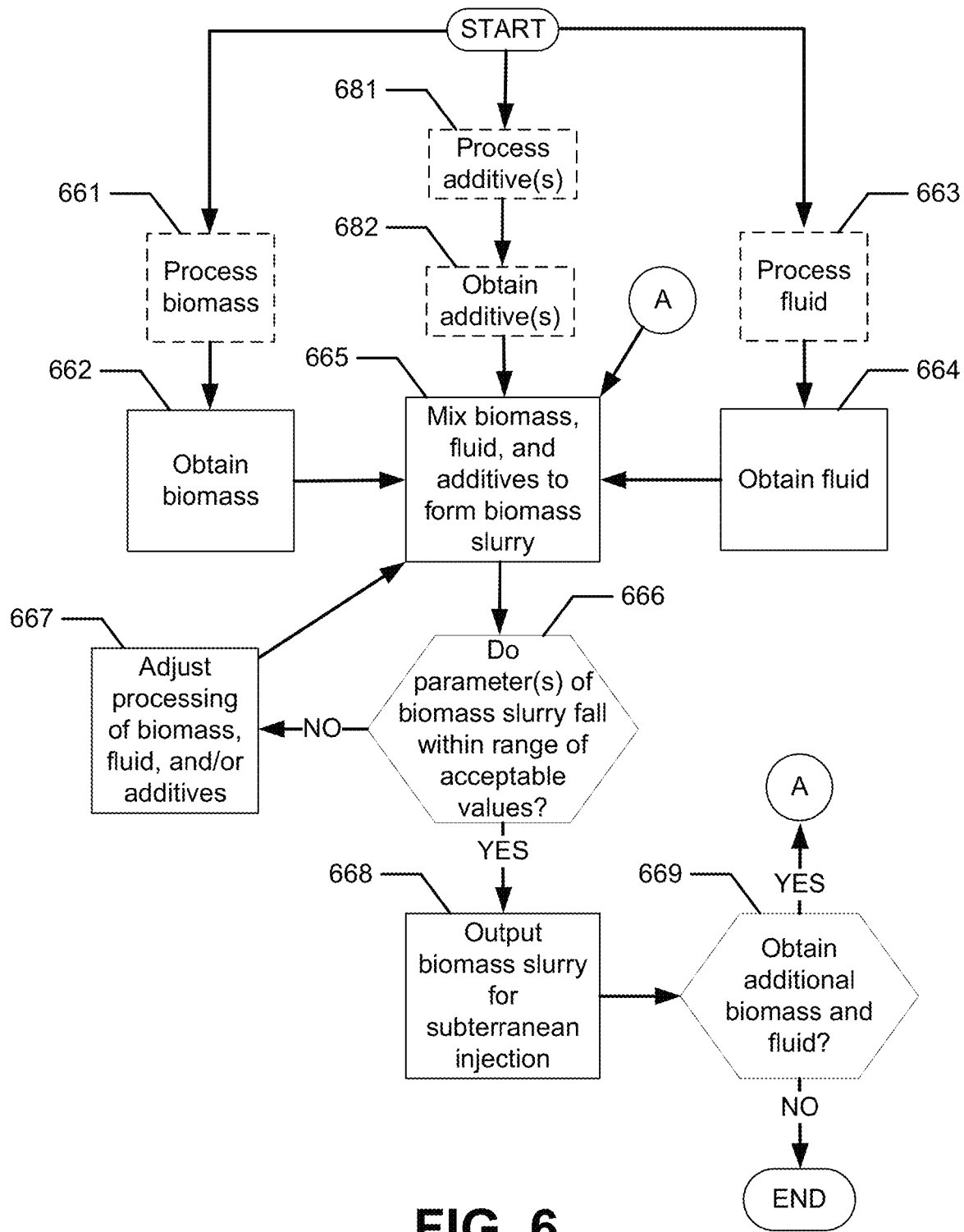
FIG. 6 shows a flowchart of a method for preparing a biomass slurry for subterranean injection according to certain example embodiments.

FIG. 6 shows a flowchart 698 of a method for preparing a biomass slurry for subterranean injection according to certain example embodiments. While the various steps in this flowchart 698 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order. Some or all of the steps of the method of FIG. 6 may be performed off site (e.g., in a laboratory remote from a field operation). In addition, or in the alternative, some or all of the steps of the method of FIG. 6 may be performed on site (e.g., in the field, adjacent to a wellbore 311) where a field operation is being performed or planned.

In addition, a person of ordinary skill in the art will appreciate that additional steps not shown in FIG. 6 may be included in performing this method. Accordingly, the specific arrangement of steps should not be construed as limiting the scope. Further, a particular computing device, such as the computing device 518 discussed above with respect to FIG. 5, may be used to facilitate (e.g., direct, control, provide instructions, provide recommendations, perform, execute) performance of one or more of the steps for the methods shown in FIG. 6 in certain example embodiments. Any of the functions performed below by a controller 304 (an example of which is discussed above with respect to FIG. 4) may involve the use of one or more protocols 432, one or more algorithms 433, and/or stored data 434 stored in a storage repository 431. In addition, or in the alternative, any of the functions (or portions thereof) in the method may be performed by a user (e.g., user 359).

The method shown in FIG. 6 is merely an example that may be performed by using an example system described herein. In other words, systems for preparing a biomass slurry for subterranean injection may perform other functions using other methods in addition to and/or aside from those described with respect to FIG. 6. Referring to the description above with respect to FIGS. 1A through 5, the method shown in the flowchart 698 of FIG. 6 begins at the START step and proceeds to optional step 661, where the biomass slurry feedstock 327 is processed. The biomass slurry feedstock 327 may be processed using the biomass preparation apparatus 393, which may receive the biomass slurry feedstock 327 from one or more biomass sources 328 via part of the conveyance network 388.

The biomass preparation apparatus 393 is configured to prepare or process the biomass slurry feedstock 327 in such a way that the biomass slurry feedstock 327 is in condition to be put in the mixing apparatus 395. For example, the biomass preparation apparatus 393 may grind and/or mill the biomass slurry feedstock 327 (including the Biomass) into pieces so that each piece of the biomass slurry feedstock 327 falls within a range of sizes (e.g., between approximately 0.01 μm and approximately 60,000 μm, no greater than approximately 650 μm, between approximately 2 μm and approximately 1,000 μm, any of the other example ranges and/or limits listed herein). As another example, as when the biomass slurry feedstock 327 includes both chemically treated and natural material, the biomass preparation apparatus 393 may include a combiner or other type of mixer that combines both types of biomass so that both types of biomass slurry feedstock 327 are substantially evenly distributed throughout the resulting combined biomass slurry feedstock 327. Also, in such a case, the biomass preparation apparatus 393 may control the introduction of one or both types of biomass slurry feedstock 327 so that the ratio or percentage of one type of biomass slurry feedstock 327 falls within a desired range (e.g., between 0% and 40% chemically treated, no more than 75% chemically treated, between 10% and 60% chemically treated).

When the biomass preparation apparatus 393 is included in the biomass slurry preparation system 350, the biomass preparation apparatus 393 may be controlled by a controller 304 (e.g., a controller 304 of the biomass slurry preparation system 350). In such a case, the controller 304 may control the operation of the biomass preparation apparatus 393 based on measurements, as measured by one or more of the sensor devices 360, of one or more parameters associated with the biomass slurry feedstock 327 and/or the biomass preparation apparatus 393. In alternative embodiments, rather than being part of the biomass slurry preparation system 350, some or all of the biomass preparation apparatus 393 is controlled by a third party (e.g., another corporate entity). Some or all of the biomass preparation apparatus 393 may be located proximate to the mixing apparatus 395 and/or located remotely from the mixing apparatus 395. In either case, the biomass slurry feedstock 327, whether pre-processing or post-processing, is moved from one location to another by part of the conveyance network 388.

In step 662, the biomass slurry feedstock 327 is obtained. As used herein, the term "obtaining" may include collecting, receiving, retrieving, accessing, generating, etc. or any other manner of obtaining something (in this case, biomass slurry feedstock 327) from one or more sources (e.g., one or more of the biomass sources 328). The biomass slurry feedstock 327 may be obtained, directly or indirectly, from one or more biomass sources 328. In some cases, all of the biomass slurry feedstock 327 that is obtained has been processed by the biomass preparation apparatus 393. The biomass slurry feedstock 327 is obtained using part of the conveyance network 388.

According to certain example embodiments, the biomass slurry feedstock 327 is obtained by the vessel 351 of the mixing apparatus 395 at one or more of the inputs 352 (e.g., input 352-1) of the mixing apparatus 395. The biomass slurry feedstock 327 may be obtained on a continuous basis (e.g., at a constant rate, at a variable rate) over some period of time or on an intermittent or iterative basis. The rate or other basis at which the biomass slurry feedstock 327 is obtained may be controlled at the one or more inputs 352 of the mixing apparatus 395. In some cases, when the biomass slurry feedstock 327 is obtained, the mixing apparatus 395 or other component of the biomass slurry preparation system 350 may be configured to verify, in real time, that one or more of the characteristics (e.g., composition by type, size or range of sizes, rate of obtaining) of the biomass slurry feedstock 327 fall within acceptable ranges of values. In such a case, the mixing apparatus 395 or other component of the biomass slurry preparation system 350 may further be configured to make changes to the operation of the mixing apparatus 395 (e.g., slow the rate of a mixing mechanism) and/or part of the conveyance network 388 (e.g., adjusting a valve 385, slowing or stopping a conveyer belt) so that the range of acceptable values of the various characteristics of the biomass slurry feedstock 327 is achieved in real time.

Such capabilities (as well as the overall process of obtaining the biomass slurry feedstock 327) may be performed by a controller 304 of the mixing apparatus 395 (or other part of the biomass slurry preparation system 350) using one or more protocols 432, one or more algorithms 433 (e.g., models), stored data 434, measurements of one or more sensor devices 360, input from a user 359 (which may include an associated user system 355), and/or any other source of information within the overall system 300. In addition, or in the alternative, some or all of the process of obtaining the biomass slurry feedstock 327 may be controlled by a user 359.

In step 663, the fluid 337 is processed. The fluid 337 may be processed using the fluid preparation apparatus 394, which may receive the fluid 337 from one or more fluid sources 338 via part of the conveyance network 388. The fluid preparation apparatus 394 is configured to prepare or process the fluid 337 in such a way that the fluid 337 is in condition to be put in the mixing apparatus 395. For example, the fluid preparation apparatus 394 may control the chemical composition of the fluid 337 so that the fluid 337 has a minimum salt content (e.g., at least approximately 0.05%) or range of salt content (e.g., between approximately 1% and approximately 20%, any of the other example ranges and/or limits listed herein). As another example, the fluid preparation apparatus 394 may control the chemical composition of the fluid 337 so that the fluid 337 has a certain pH or has a pH that falls within a range of acceptable values. When multiple fluids 337 are combined by the fluid preparation apparatus 394 to create a combined fluid 337, the fluid preparation apparatus 394 may control the introduction of one or more of the fluids 337 so that the ratio or percentage of one of the fluids 337 falls within a desired range (e.g., between 0% and 40%, no more than 75%, between 50% and 60%) relative to the combined fluid 337.

When the fluid preparation apparatus 394 is included in the biomass slurry preparation system 350, the fluid preparation apparatus 394 may be controlled by a controller 304 (e.g., a controller 304 of the biomass slurry preparation system 350). In such a case, the controller 304 may control the operation of the fluid preparation apparatus 394 based on measurements, as measured by one or more of the sensor devices 360, of one or more parameters associated with the fluid 337 and/or the fluid preparation apparatus 394. In alternative embodiments, rather than being part of the biomass slurry preparation system 350, some or all of the fluid preparation apparatus 394 is controlled by a third party (e.g., another corporate entity). Some or all of the fluid preparation apparatus 394 may be located proximate to the mixing apparatus 395 and/or located remotely from the mixing apparatus 395. In either case, the fluid, whether pre-processing or post-processing, is moved from one location to another by part of the conveyance network 388.

In step 664, the fluid 337 is obtained. The fluid 337 may be obtained, directly or indirectly, from one or more fluid sources 338. In some cases, all of the fluid 337 that is obtained has been processed by the fluid preparation apparatus 394. The fluid 337 is obtained using part of the conveyance network 388. According to certain example embodiments, the fluid 337 is obtained by the vessel 351 of the mixing apparatus 395 at one or more of the inputs 352 (e.g., input 352-2) of the mixing apparatus 395. The fluid 337 may be obtained on a continuous basis (e.g., at a constant rate, at a variable rate) over some period of time or on an intermittent or iterative basis. The rate or other basis at which the fluid 337 is obtained may be controlled at the one or more inputs 352 of the mixing apparatus 395. In some cases, when the fluid 337 is obtained, the mixing apparatus 395 or other component of the biomass slurry preparation system 350 may be configured to verify, in real time, that one or more of the characteristics (e.g., chemical composition, pH, rate of obtaining) of the fluid 337 fall within acceptable ranges of values. In such a case, the mixing apparatus 395 or other component of the biomass slurry preparation system 350 may further be configured to make changes to the operation of the mixing apparatus 395 (e.g., slow the rate of a mixing mechanism) and/or part of the conveyance network 388 (e.g., adjusting a valve 385) so that the range of acceptable values of the various characteristics of the fluid 337 is achieved in real time.

Such capabilities (as well as the overall process of obtaining the fluid 337) may be performed by a controller 304 of the mixing apparatus 395 (or other part of the biomass slurry preparation system 350) using one or more protocols 432, one or more algorithms 433 (e.g., models), stored data 434, measurements of one or more sensor devices 360, input from a user 359 (which may include an associated user system 355), and/or any other source of information within the overall system 300. In addition, or in the alternative, some or all of the process of obtaining the fluid 337 may be controlled by a user 359.

In step 681, one or more optional additives 357 are processed. Each additive 357 may be processed using the additive preparation apparatus 392, which may receive an additive 357 from one or more additive sources 358 via part of the conveyance network 388. The additive preparation apparatus 392 is configured to prepare or process an additive 357 in such a way that the additive 357 is in condition to be put in the mixing apparatus 395, the biomass preparation apparatus 393, and/or the fluid preparation apparatus 394. For example, the additive preparation apparatus 392 may control the chemical composition of an additive 357 so that the additive 357 falls within a range of temperatures (e.g., between approximately 85° F. and approximately 105° F.), a range of particle sizes (e.g., between approximately 1 μm and approximately 100 μm), and/or a range of viscosities (e.g., between approximately 15 cP and approximately 10,000 cP). When multiple additives 357 are combined by the additive preparation apparatus 392 to create a combined additive 357, the additive preparation apparatus 392 may control the introduction of one or more of the additives 357 so that the ratio or percentage of one of the additives 357 falls within a desired range (e.g., between 0% and 40%, no more than 75%, between 50% and 60%) relative to the combined additive 357.

When the additive preparation apparatus 392 is included in the biomass slurry preparation system 350, the additive preparation apparatus 392 may be controlled by a controller 304 (e.g., a controller 304 of the biomass slurry preparation system 350). In such a case, the controller 304 may control the operation of the additive preparation apparatus 392 based on measurements, as measured by one or more of the sensor devices 360, of one or more parameters associated with an additive 357 and/or the additive preparation apparatus 392. In alternative embodiments, rather than being part of the biomass slurry preparation system 350, some or all of the additive preparation apparatus 392 is controlled by a third party (e.g., another corporate entity). Some or all of the additive preparation apparatus 392 may be located proximate to the mixing apparatus 395 and/or located remotely from the mixing apparatus 395. In either case, each additive 357, whether pre-processing or post-processing, is moved from one location to another by part of the conveyance network 388.

In step 682, the one or more optional additives 357 are obtained. Each additive 357 may be obtained, directly or indirectly, from one or more additive sources 358. In some cases, all of the additives 357 that are obtained have been processed by the additive preparation apparatus 392. An additive 357 is obtained using part of the conveyance network 388. According to certain example embodiments, an additive 357 is obtained by the vessel 351 of the mixing apparatus 395 at one or more of the inputs 352 (e.g., input 352-3) of the mixing apparatus 395. Alternatively, an additive 357 is obtained by the biomass preparation apparatus 393 and/or the fluid preparation apparatus 394. An additive 357 may be obtained on a continuous basis (e.g., at a constant rate, at a variable rate) over some period of time or on an intermittent or iterative basis.

The rate or other basis at which an additive 357 is obtained may be controlled at the one or more inputs 352 of the mixing apparatus 395. In some cases, when an additive 357 is obtained, the mixing apparatus 395 or other component of the biomass slurry preparation system 350 may be configured to verify, in real time, that one or more of the characteristics (e.g., chemical composition, pH, rate of obtaining) of an additive 357 fall within acceptable ranges of values. In such a case, the mixing apparatus 395 or other component of the biomass slurry preparation system 350 may further be configured to make changes to the operation of the mixing apparatus 395 (e.g., slow the rate of a mixing mechanism) and/or part of the conveyance network 388 (e.g., adjusting a valve 385) so that the range of acceptable values of the various characteristics of an additive 357 is achieved in real time.

Such capabilities (as well as the overall process of obtaining an additive 357) may be performed by a controller 304 of the mixing apparatus 395 (or other part of the biomass slurry preparation system 350) using one or more protocols 432, one or more algorithms 433 (e.g., models), stored data 434, measurements of one or more sensor devices 360, input from a user 359 (which may include an associated user system 355), and/or any other source of information within the overall system 300. In addition, or in the alternative, some or all of the process of obtaining an additive 357 may be controlled by a user 359.

In step 665, the biomass slurry feedstock 327, the fluid 337, and any additives 357 are mixed to form the biomass slurry 347. The biomass slurry feedstock 327, the fluid 337, and any additives 357 may be mixed within the vessel 351 of the mixing apparatus 395 using one or more environmental control components 356 (e.g., a mixer, an agitator, an aerator). Some or all of the biomass slurry feedstock 327, some or all of the fluid 337, and some or all of the additives 357 may be mixed at once (e.g., in a single stage or step) or over time (e.g., in multiple stages or steps). When the biomass slurry feedstock 327 is mixed with the fluid 337, the pieces of biomass slurry feedstock 327 may be substantially evenly distributed within the fluid 337. In addition, or in the alternative, when an additive 357 is mixed with the biomass slurry feedstock 327 and the fluid 337, the additive 357 may be substantially evenly distributed within the biomass slurry feedstock 327 and the fluid 337.

Mixing the biomass slurry feedstock 327, the fluid 337, and any additives 357 may be performed by a controller 304 of the mixing apparatus 395 (or other part of the biomass slurry preparation system 350) using one or more protocols 432, one or more algorithms 433 (e.g., models), stored data 434, measurements of one or more sensor devices 360, input from a user 359 (which may include an associated user system 355), and/or any other source of information within the overall system 300. In addition, or in the alternative, some or all of the process of mixing the biomass slurry feedstock 327, the fluid 337, and/or any additives 357 may be controlled by a user 359. The mixing apparatus 395 may operate to mix the biomass slurry feedstock 327, the fluid 337, and any additives 357 on a continuous basis (e.g., at a constant rate, at a variable rate) over some period of time or on an intermittent or iterative basis.

In step 666, a determination is made as to whether the values of one or more of the parameters associated with the biomass slurry 347 fall within a range of acceptable values. These parameters, including but not limited to salt content, viscosity, pH, percent solids, specific gravity, and density, directly influence the formulation and overall performance of the biomass slurry 347. For instance, the incorporation of wood/forestry waste into the biomass slurry feedstock 327 introduces variables that a controller 304 (or portion thereof, such as the slurry component evaluation module 441 and/or the slurry evaluation module 443) evaluates and implements adjustments to in real time.

Values of the one or more parameters associated with the biomass slurry 347 may be measured by one or more of the sensor devices 360. In such a case, a sensor device 360 may measure a parameter (e.g., salt content, viscosity, pH, percent of solids in liquids, specific gravity, density) associated with the biomass slurry 347 on a continuous basis (e.g., without pause, every 30 seconds, every hour, at a variable frequency) over some period of time or on an intermittent or iterative basis (e.g., on the occurrence of an event). A measurement of the biomass slurry 347 may be taken while the biomass slurry 347 is in the vessel 351 of the mixing apparatus 395 or outside the vessel 351.

The determination as to whether a value of a parameter falls within a range of acceptable values may be made by a controller 304 (including the slurry component evaluation module 441 and/or the slurry evaluation module 443 thereof) of the mixing apparatus 395 (or other part of the biomass slurry preparation system 350) using one or more protocols 432, one or more algorithms 433 (e.g., models), stored data 434 (e.g., including the appropriate range of acceptable values), measurements of one or more sensor devices 360, input from a user 359 (which may include an associated user system 355), and/or any other source of information within the overall system 300. By adjusting parameters such as pH, solid content, etc. based on real-time feedback provided by the measurements of the sensor devices 360, a controller 304 (including the slurry component evaluation module 441 and/or the slurry evaluation module 443 thereof) may refine the formulation of the slurry 347 to accommodate the specific properties of wood/forestry waste, thereby enhancing the effectiveness and stability of the final slurry 347.

For example, the slurry evaluation module 443, using one or more algorithms 433, one or more protocols 432, and stored data 434 (e.g., values associated with the measurements made by the sensor devices 360) may evaluate the slurry 347 (e.g., the formulation of the slurry 347, one or more of the properties (e.g., salt content, viscosity, density, size or range of sizes of the biomass slurry feedstock 327) of the biomass slurry 347) at a point in time and/or over time. In some cases, the slurry evaluation module 443, using one or more algorithms 433, one or more protocols 432, and stored data 434, may identify (and in some cases implement (e.g., control the conveyance network 388, control the fluid preparation apparatus 394, control the additive preparation apparatus 392, control the biomass preparation apparatus 393)) specific steps (e.g., add/remove/alter an amount of an additive 357, introduce an additive 357 into the fluid preparation apparatus 394 rather than the mixing apparatus 395) that may be taken to improve or optimize one or more of the properties of the biomass slurry 347 that is created within and output by the mixing apparatus 395. If a value of a parameter associated with the biomass slurry 347 falls within a range of acceptable values, the process proceeds to step 668. If a value of a parameter associated with the biomass slurry 347 falls outside a range of acceptable values, the process proceeds to step 667.

In step 667, the processing of the biomass slurry feedstock 327, the fluids 337, and/or the additives 357 is adjusted. In certain example embodiments, a controller 304 of the mixing apparatus 395 (or other part of the biomass slurry preparation system 350) initiates, instructs another controller 304, informs a user 359 (e.g., via an associated user system 355), and/or performs the adjustment. When an adjustment is made, the adjustment may involve a change in operation of the biomass preparation apparatus 393, the fluid preparation apparatus 394, the additive preparation apparatus 392, the mixing apparatus 395 (e.g., one or more of the environmental control components 356), the conveyance network 388 (or portions thereof), one or more of the biomass sources 328, one or more of the fluid sources 338, and/or one or more of the additive sources 358.

In such a case, the controller 304 (including the recommendation module 442 thereof) may use one or more protocols 432, one or more algorithms 433 (e.g., models), stored data 434 (e.g., including the appropriate range of acceptable values), measurements of one or more sensor devices 360, input from a user 359 (which may include an associated user system 355), and/or any other source of information within the overall system 300 to make or propose the one or more adjustments to the operation of the biomass flurry preparation system 350. In addition, or in the alternative, some or all of the adjustments to the operation of the biomass flurry preparation system 350 may be implemented by a user 359. When step 667 is complete, the process reverts to step 665.

In step 668, the biomass slurry 347 is output for subterranean injection. The biomass slurry 347 may be output from the vessel 351 of the mixing apparatus 395 through one or more outputs 354 in the vessel 351. The biomass slurry 347 may be output from the vessel 351 using one or more environmental control components 356 of the mixing apparatus 395. Once the biomass slurry 347 is output from the vessel 351, the biomass slurry 347 may be delivered to biomass slurry injection equipment 309 using part of the conveyance network 388. The biomass slurry injection equipment 309 then injects the biomass slurry 347 into one or more of the wellbores 311.

In certain example embodiments, a controller 304 of the biomass slurry preparation system 350 (or portion thereof, such as the mixing apparatus 395) may use one or more protocols 432, one or more algorithms 433 (e.g., models), stored data 434 (e.g., including the appropriate range of acceptable values), measurements of one or more sensor devices 360, input from a user 359 (which may include an associated user system 355), and/or any other source of information within the overall system 300 to output the biomass slurry 347 from the vessel 351. In addition, or in the alternative, the biomass slurry 347 may be output from the vessel 351 by a user 359 (including an associated user system 355).

In step 669, a determination is made as to whether additional biomass slurry feedstock 327 and fluid 337 are obtained. Obtaining the additional biomass slurry feedstock 327 and fluid 337 may be substantially similar to what is described above with respect to steps 662 and 664, respectively. The determination as to whether additional biomass slurry feedstock 327 and fluid 337 are obtained may be made by a controller 304 of the biomass slurry preparation system 350 (or portion thereof, such as the mixing apparatus 395) using one or more protocols 432, one or more algorithms 433 (e.g., models), stored data 434 (e.g., including the appropriate range of acceptable values), measurements of one or more sensor devices 360, input from a user 359 (which may include an associated user system 355), and/or any other source of information within the overall system 300. In addition, or in the alternative, the determination as to whether additional biomass slurry feedstock 327 and fluid 337 are obtained may be made by a user 359 (including an associated user system 355). If additional biomass slurry feedstock 327 and fluid 337 are obtained, the process reverts to step 665. If additional biomass slurry feedstock 327 and fluid 337 are not obtained, then the process proceeds to the END step.

Figure 7:
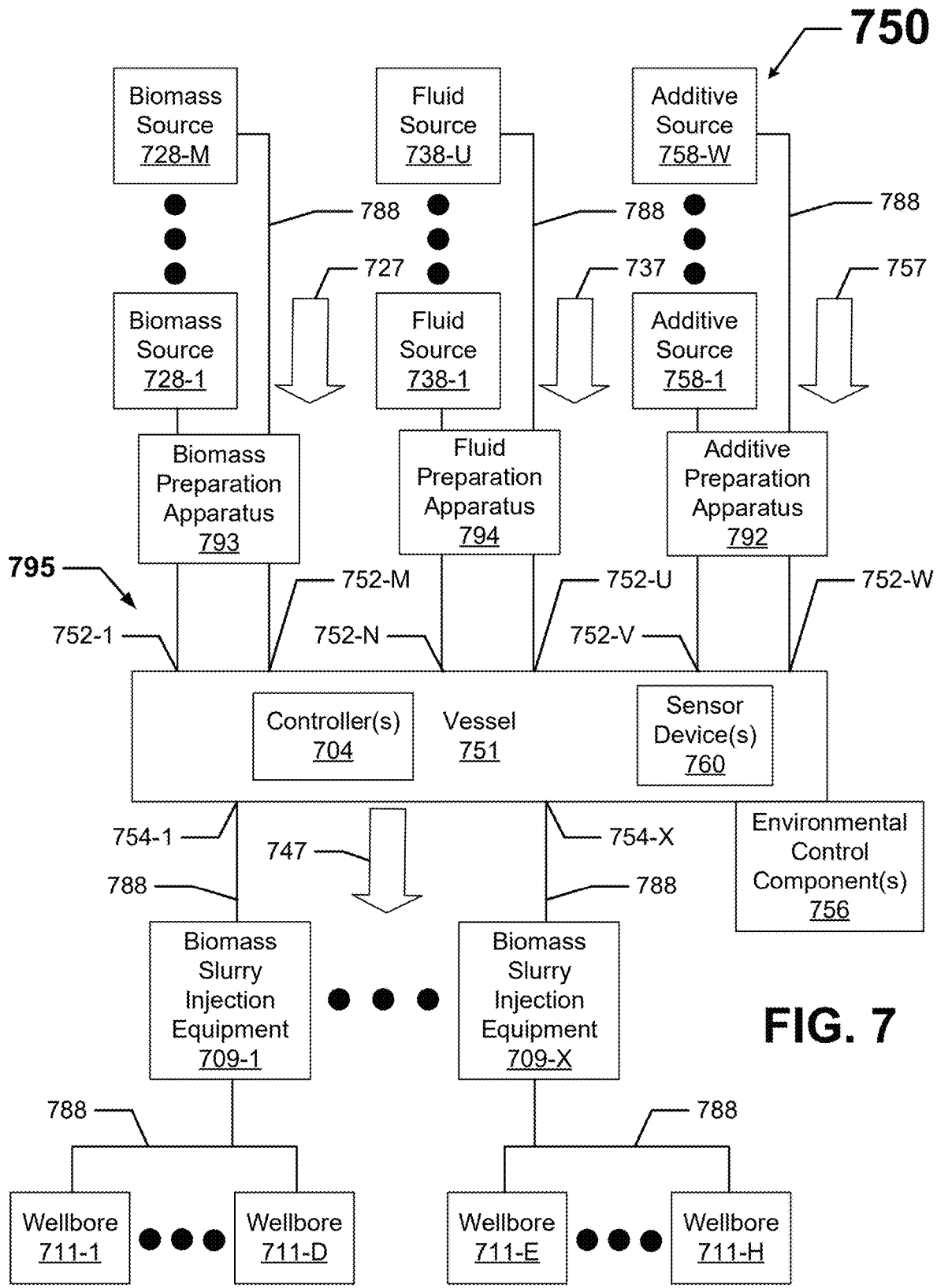
FIG. 7 shows a block diagram of another biomass slurry preparation system according to certain example embodiments.

FIG. 7 shows a block diagram of another biomass slurry preparation system 750 according to certain example embodiments. Referring to the description above with respect to FIGS. 1A through 6, the biomass slurry preparation system 750 of FIG. 7 (including its various components, including but not limited to the biomass sources 728, the fluid sources 738, the additive sources 758, the biomass slurry feedstock 727, the fluid 737, the additives 757, the biomass preparation apparatus 793, the fluid preparation apparatus 794, the additive preparation apparatus 792, the mixing apparatus 795 (including, for example, the controller 704, the sensor devices 760, the environmental control components 756, the vessel 751), the conveyance network 788, the biomass slurry injection equipment 709, the biomass slurry 747, and the wellbores 711) is substantially similar to the biomass slurry preparation system 350 (and its corresponding components) of FIG. 3 discussed above.

In this example, the biomass slurry preparation system 750 of FIG. 7 includes multiple (in this case, M) biomass sources 728 (biomass source 728-1 through biomass source 728-M), multiple (in this case, U) fluid sources 738 (fluid source 738-1 through fluid source 738-U), multiple (in this case, W) additive sources 758 (additive source 758-1 through additive source 758-W). The biomass slurry feedstock 727 from the biomass sources 728 are delivered to the biomass preparation apparatus 793 via part of the conveyance network 788. After the biomass slurry feedstock 727 is processed, the biomass slurry feedstock 727 is delivered to multiple inputs 752 (in this case, input 752-1 through input 752-M) in the vessel 751 of the mixing apparatus 795 via part of the conveyance network 788.

The fluid 737 from the fluid sources 738 are delivered to the fluid preparation apparatus 794 via part of the conveyance network 788. After the fluid 737 is processed, the fluid 737 is delivered to multiple inputs 752 (in this case, input 752-N through input 752-U) in the vessel 751 of the mixing apparatus 795 via part of the conveyance network 788. The additives 757 from the additive sources 758 are delivered to the additive preparation apparatus 792 via part of the conveyance network 788. After the additives 757 are processed, the additives 757 are delivered to multiple inputs 752 (in this case, input 752-V through input 752-W) in the vessel 751 of the mixing apparatus 795 via part of the conveyance network 788.

The biomass slurry feedstock 727, the fluid 737, and the additives 757 enter the vessel 751 of the mixing apparatus 795 through the various inputs 752. Once inside the vessel 751, at least some of the environmental control components 756, as controlled by the controller 704 with the use of measurements made by the sensor devices 760, are used to combine the biomass slurry feedstock 727, the fluid 737, and the additives 757 to form the biomass slurry 747. Once the biomass slurry 747 is created (and in some cases verified to have the desired characteristics by the controller 704 with the aid of the sensor devices 760), the biomass slurry 747 is delivered to the biomass slurry injection equipment 709 through outputs 754 in the vessel 751. In this case, there are X outputs 754 (output 754-1 through output 754-X) in the vessel 751.

Part of the conveyance network 788 delivers the biomass slurry 747 to multiple (in this case, X) sets of biomass slurry injection equipment 709 (biomass slurry injection equipment 709-1 through biomass slurry injection equipment 709-X). Each set of biomass slurry injection equipment 709 in this case injects the biomass slurry 747 into multiple wellbores 711. For example, biomass slurry injection equipment 709-1 injects biomass slurry 747 into wellbore 711-1 through wellbore 711-D. As another example, biomass slurry injection equipment 709-X injects biomass slurry 747 into wellbore 711-E through wellbore 711-H.

Example embodiments can include multiple components that are described herein, where a component can be made from a single piece (as from a mold or an extrusion). When a component (or portion thereof) of an example embodiment for biomass slurry preparation systems is made from a single piece, the single piece can be cut out, bent, stamped, and/or otherwise shaped to create certain features, elements, or other portions of the component. Alternatively, a component (or portion thereof) of an example embodiment for biomass slurry preparation systems can be made from multiple pieces that are mechanically coupled to each other. In such a case, the multiple pieces can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, rotatably, removably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example biomass slurry preparation system) can be made of one or more of a number of suitable materials, including but not limited to metal (e.g., stainless steel), ceramic, rubber, glass, and plastic.

A coupling feature (including a complementary coupling feature) as described herein can allow one or more components (e.g., a housing) and/or portions of an example embodiment for biomass slurry preparation systems to become mechanically coupled, directly or indirectly, to another portion of the example embodiment for biomass slurry preparation systems and/or a component of a larger system. A coupling feature can include, but is not limited to, a portion of mating threads, a hinge, an aperture, a recessed area, a protrusion, a slot, and a detent. One portion of an example biomass slurry preparation system can be coupled to another portion of the example embodiment of a biomass slurry preparation system and/or a component of a larger system by the direct use of one or more coupling features.

In addition, or in the alternative, a portion of an example embodiment for biomass slurry preparation systems can be coupled to another portion of the example embodiment for biomass slurry preparation systems and/or a component of a larger system using one or more independent devices that interact with one or more coupling features disposed on a component of the example embodiment for biomass slurry preparation systems. Examples of such devices can include, but are not limited to, a fastening device (e.g., a bolt, a screw, a rivet), a pin, a hinge, an adapter, and a spring. One coupling feature described herein can be the same as, or different than, one or more other coupling features described herein. A complementary coupling feature as described herein can be a coupling feature that mechanically couples, directly or indirectly, with another coupling feature.

Example embodiments can be used to utilize wood waste and other similar forms of biomass to reduce carbon and/or other environmental emissions by creating a biomass slurry from the wood waste and injecting the biomass slurry into a subterranean formation. Example embodiments may operate continuously for extended periods of time or in discrete increments of time. The process of preparing the biomass slurry and/or its various components may be controlled, at least in part and in real time, automatically by a controller using measurements, made by sensor devices, of one or more parameters associated with the biomass slurry and/or performance of the biomass slurry preparation system.

Example embodiments are configured to prepare the biomass, fluids, and any applicable additives in such a way that the biomass slurry that results from the combination of those ingredients has certain desired characteristics for subterranean injection. Example embodiments also provide a number of other benefits. Such other benefits can include, but are not limited to, generation of verifiable carbon removal credits in environmental markets, disposal of solid wastes, and reduction in wildfire severity.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for preparing a biomass slurry for subterranean injection, the method comprising:
    obtaining a quantity of a biomass slurry feedstock from a source, wherein the biomass slurry feedstock comprises a plurality of pieces, wherein the biomass slurry feedstock comprises a composite of cellulose in a lignin matrix, hemicellulose fibers in a lignin matrix, or any combination thereof, and wherein each of the plurality of pieces has a size not to exceed approximately 60,000 μm;
    obtaining a volume of a fluid, wherein the fluid comprises a salt content of at least approximately 0.05%; and
    mixing the biomass slurry feedstock and the volume of fluid to form the biomass slurry, wherein the plurality of pieces are substantially evenly distributed within the fluid, and wherein the biomass slurry is configured to be used in the subterranean injection.

2. The method of claim 1, further comprising:
    processing the quantity of the biomass slurry feedstock prior to mixing, wherein processing the quantity of the biomass slurry feedstock comprises grinding or milling the quantity of the biomass slurry feedstock into the plurality of pieces.

3. The method of claim 1, further comprising:
    processing the volume of the fluid prior to mixing.

4. The method of claim 3, wherein processing the volume of the fluid comprises adding a salt-based compound to the volume of fluid prior to mixing to achieve the salt content of at least approximately 0.05%.

5. The method of claim 1, wherein the biomass slurry feedstock comprises chemically treated wood.

6. The method of claim 5, wherein the biomass slurry feedstock comprises at least one of a group consisting of railroad ties, utility poles, landscaping, garden beds, playground structures, decks, furniture, and fence pickets.

7. The method of claim 1, wherein the fluid comprises at least one of a group consisting of a corrosion inhibitor, a surfactant, and a viscosifier.

8. The method of claim 1, wherein the volume of the fluid and the quantity of the biomass slurry feedstock are obtained at a substantially constant rate over a period of time.

9. The method of claim 1, further comprising:
outputting the biomass slurry to biomass slurry injection equipment.

* * * * *